United States Patent
Kawata et al.

(10) Patent No.: US 9,234,268 B2
(45) Date of Patent: Jan. 12, 2016

(54) HIGH-STRENGTH GALVANIZED STEEL SHEET EXCELLENT IN BENDABILITY AND MANUFACTURING METHOD THEREOF

(75) Inventors: Hiroyuki Kawata, Tokyo (JP); Naoki Maruyama, Tokyo (JP); Akinobu Murasato, Tokyo (JP); Akinobu Minami, Tokyo (JP); Takeshi Yasui, Tokyo (JP); Takuya Kuwayama, Tokyo (JP); Shigeru Yonemura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/234,826

(22) PCT Filed: Jul. 27, 2012

(86) PCT No.: PCT/JP2012/069260
§ 371 (c)(1),
(2), (4) Date: Mar. 5, 2014

(87) PCT Pub. No.: WO2013/018739
PCT Pub. Date: Feb. 7, 2013

(65) Prior Publication Data
US 2014/0212684 A1    Jul. 31, 2014

(30) Foreign Application Priority Data

Jul. 29, 2011   (JP) .................. 2011-167436

(51) Int. Cl.
| | | |
|---|---|---|
| B32B 15/00 | (2006.01) |
| C23C 2/02 | (2006.01) |
| C23C 2/28 | (2006.01) |
| B32B 15/01 | (2006.01) |
| C22C 38/00 | (2006.01) |
| C22C 38/02 | (2006.01) |
| C22C 38/04 | (2006.01) |
| C22C 38/06 | (2006.01) |
| C21D 8/04 | (2006.01) |
| C21D 9/48 | (2006.01) |
| C21D 8/02 | (2006.01) |
| C23C 2/06 | (2006.01) |
| C23C 2/26 | (2006.01) |
| C22C 38/12 | (2006.01) |
| C22C 38/14 | (2006.01) |
| C22C 38/16 | (2006.01) |
| C22C 38/34 | (2006.01) |
| C22C 38/38 | (2006.01) |
| C22C 18/00 | (2006.01) |

(52) U.S. Cl.
CPC .............. *C23C 2/02* (2013.01); *B32B 15/013* (2013.01); *C21D 8/0263* (2013.01); *C21D 8/041* (2013.01); *C21D 8/0436* (2013.01); *C21D 8/0473* (2013.01); *C21D 9/48* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/34* (2013.01); *C22C 38/38* (2013.01); *C23C 2/06* (2013.01); *C23C 2/26* (2013.01); *C23C 2/28* (2013.01); *C21D 2211/001* (2013.01); *C21D 2211/002* (2013.01); *C21D 2211/005* (2013.01); *C21D 2211/008* (2013.01); *C22C 18/00* (2013.01); *Y10T 428/12611* (2015.01); *Y10T 428/12799* (2015.01)

(58) Field of Classification Search
None
See application file for complete search history.

(56) References Cited

U.S. PATENT DOCUMENTS

| | | | |
|---|---|---|---|
| 6,623,868 B1 * | 9/2003 | Shindou et al. ............... | 428/659 |
| 2008/0000555 A1 | 1/2008 | Nonaka et al. | |
| 2010/0104891 A1 * | 4/2010 | Nakagaito et al. ........... | 428/659 |
| 2011/0048588 A1 | 3/2011 | Mega et al. | |
| 2011/0139315 A1 * | 6/2011 | Nakagaito et al. ............ | 148/533 |
| 2012/0222781 A1 * | 9/2012 | Azuma et al. ................. | 148/518 |
| 2012/0312433 A1 * | 12/2012 | Mizuta et al. ................. | 148/645 |

FOREIGN PATENT DOCUMENTS

| | | |
|---|---|---|
| EP | 1 002 886 A1 | 5/2000 |
| JP | 5-195149 A | 8/1993 |
| JP | 2005-298984 A | 10/2005 |
| JP | 2006-70328 A | 3/2006 |

(Continued)

OTHER PUBLICATIONS

International Search Report issued in PCT/JP2012/069260, mailed on Oct. 30, 2012.

(Continued)

*Primary Examiner* — Humera Sheikh
*Assistant Examiner* — Seth Dumbris
(74) *Attorney, Agent, or Firm* — Birch, Stewart, Kolasch & Birch, LLP

(57) ABSTRACT

The present invention provides a high-strength galvanized steel sheet with maximum tensile strength of 900 MPa or more. The high-strength galvanized steel sheet has an alloyed galvanized layer formed on a surface of a base steel sheet containing predetermined amounts of C, Si, Mn, P, S, Al, N, O with a balance being constituted of iron and inevitable impurities, in which in a structure of the base steel sheet, retained austenite is limited to 8% or less in volume fraction, kurtosis K* of the hardness distribution between 2% hardness and 98% hardness is −0.30 or less, a ratio between Vickers hardness of surface layer of the base steel sheet and Vickers hardness of ¼ thickness of the base steel sheet is 0.35 to 0.70, and a content of iron in the alloyed galvanized layer is 8 to 12% in mass %.

4 Claims, No Drawings

(56) References Cited

FOREIGN PATENT DOCUMENTS

| | | | |
|---|---|---|---|
| JP | 2007-00931 A | 1/2007 | |
| JP | 2007-016319 A | 1/2007 | |
| JP | 2009-215616 A | 9/2009 | |
| JP | 2009-228128 A | 10/2009 | |
| JP | 2009-270126 A | 11/2009 | |
| JP | 2010-059452 A | 3/2010 | |
| JP | 2010-065269 A | 3/2010 | |
| JP | 2010-070843 A | 4/2010 | |
| JP | 2010-150580 A | 7/2010 | |
| JP | 2011-111671 A | 6/2011 | |
| JP | 2011-111675 A | 6/2011 | |
| JP | WO2011065591 * | 6/2011 | .............. C22C 38/58 |
| KR | 10-2002-0068529 B1 | 8/2002 | |
| TW | 200615387 A | 5/2006 | |
| WO | WO 01/34874 A1 | 5/2001 | |

OTHER PUBLICATIONS

Written Opinion issued in PCT/JP2012/069260, mailed on Oct. 30, 2012.

Canadian Office Action and Search Report for Canadian Application No. 2,842,897, dated May 8, 2015.

Extended European Search Report dated Jul. 6, 2015, issued in corresponding European Patent Application No. 12820441.9.

Korean Office Action dated Jul. 14, 2015, issued in corresponding Korean Patent Application.

* cited by examiner

HIGH-STRENGTH GALVANIZED STEEL SHEET EXCELLENT IN BENDABILITY AND MANUFACTURING METHOD THEREOF

TECHNICAL FIELD

The present invention relates to a high-strength galvanized steel sheet and a manufacturing method thereof, and particularly relates to a high-strength galvanized steel sheet having excellent bendability and a manufacturing method thereof. This application is based upon and claims the benefit of priority from Japanese Patent Application No. 2011-167436, filed in Japan on Jul. 29, 2011; the entire contents of which are incorporated herein by reference.

BACKGROUND ART

In recent years, there have been increasing demands for high-strength plated steel sheets used for automobiles or the like, and high-strength plated steel sheets with maximum tensile stress of 900 MPa or more is started to be used. As a method for forming vehicles or members of automobiles using such high-strength plated steel sheets, there may be mentioned bending such as press forming. Generally, the more the strength of a steel sheet is increased, the more the bendability worsens. Accordingly, when bending is performed on a high-strength plated steel sheet, there have been problems which occur easily, such as a crack inside a steel sheet at a deformation part, necking in an interface between a steel sheet surface and a plating layer, and destruction or peeling of a plating layer.

As a technique for improving bendability of steel sheet, Patent Document 1 proposes a high-tension hot-dip galvanized steel sheet in which a chemical composition of a steel sheet contains, in mass %, C: more than 0.02% and 0.20% or less, Si: 0.01 to 2.0%, Mn: 0.1 to 3.0%, P: 0.003 to 0.10%, S: 0.020% or less, Al: 0.001 to 1.0%, N: 0.0004 to 0.015%, and Ti: 0.03 to 0.2%, a balance includes Fe and impurities, a metal structure of the steel sheet contains 30 to 95% of ferrite by an area ratio, a second phase of the balance is constituted of one or more of martensite, bainite, perlite, cementite, and retained austenite, an area ratio of the martensite is 0 to 50% when the martensite is contained, and the steel sheet contains Ti-based carbonitride precipitates with a grain diameter of 2 to 30 nm and an average interparticle distance of 30 to 300 nm and contains a crystallized TiN with a grain diameter of 3 µm or more and an average interparticle distance of 50 to 500 µm.

Further, Patent Document 2 describes, as a hot-dip galvanized steel sheet excellent in bendability, a hot-dip galvanized steel sheet which has a chemical composition containing, in mass %, C: 0.03 to 0.11%, Si: 0.005 to 0.5%, Mn: 2.0 to 4.0%, P: 0.1% or less, S: 0.01% or less, sol. Al: 0.01 to 1.0%, N: 0.01% or less and further containing one or both of Ti: 0.50% or less and Nb: 0.50% or less in the range satisfying Ti+Nb/2≥0.03 (Ti and Nb in this expression indicate the contents of respective elements (unit: mass %)) with a balance being constituted of Fe and impurities, has a steel structure having an average interval of 300 µm or less in a sheet width direction of an Mn concentrated portion extending in a rolling direction at the position of ½0t depth (t: sheet thickness of the steel sheet) from a surface, an area ratio of ferrite of 60% or more, and an average grain diameter of ferrite of 1.0 to 6.0 µm and containing 100 or more precipitates per µm$^2$ with a grain diameter of 1 to 10 nm in ferrite, and has tensile strength of 540 MPa or more.

Further, Patent Document 3 describes, as a hot-dip plated steel sheet having both ductility and bendability, a hot-dip plated steel sheet having a plating layer containing zinc on a surface of a cold-rolled steel sheet which has a chemical composition containing, in mass %, C: 0.08 to 0.25%, Si: 0.7% or less, Mn: 1.0 to 2.6%, Al: 1.5% or less, P: 0.03% or less, S: 0.02% or less and N: 0.01% or less and having a relation between Si and Al satisfying 1.0%≤Si+Al≤1.8% with a balance being constituted of Fe and impurities, and has mechanical characteristics satisfying TS≥590 (TS: tensile strength (MPa)), TS×El≥17500 (El: total elongation (%)), and ρ1.5×t(ρ: limit bend radius (mm), t: sheet thickness (mm)).

Patent Document 4 describes, as a cold-rolled steel sheet having good ductility and bendability, a cold-rolled steel sheet which has a chemical composition containing, in mass %, C: 0.08 to 0.20%, Si: 1.0% or less, Mn: 1.8 to 3.0%, P: 0.1% or less, S: 0.01% or less, sol. Al: 0.005 to 0.5%, N: 0.01% or less and Ti: 0.02 to 0.2% with a balance being constituted of Fe and impurities, has a steel structure constituted of, in vol %, ferrite: 10% or more, bainite: 20 to 70%, retained austenite: 3 to 20% and martensite: 0 to 20% in which an average grain diameter of the ferrite is 10 µm or less, an average grain diameter of the bainite is 10 µm or less, an average grain diameter of the retained austenite is 3 µm or less, and an average grain diameter of the martensite is 3 µm or less, has mechanical characteristics such that a tensile strength (TS) is 780 MPa or more, a product (TS×El value) of tensile strength (TS) and total elongation (El) is 14000 MPa·% or more, and a minimum bend radius in a bending test is 1.5 t or less (t: sheet thickness), and has a sheet thickness of 2.0 mm or more, and describes that plating is provided on a surface of the cold-rolled steel sheet.

Patent Document 5 describes, as an alloyed hot-dip galvanized steel sheet excellent in bendability, an alloyed hot-dip galvanized steel sheet which has a chemical composition containing, in mass %, C: 0.03 to 0.12%, Si: 0.02 to 0.50%, Mn: 2.0 to 4.0%, P: 0.1% or less, S: 0.01% or less, sol. Al: 0.01 to 1.0% and N: 0.01% or less and further containing one or both of Ti: 0.50% or less and Nb: 0.50% or less in the range satisfying Ti+Nb/2≥0.03 with a balance being constituted of Fe and impurities, and has a steel structure such that an area ratio of ferrite is 60% or more and an average grain diameter of ferrite is 1.0 to 6.0 µm, in which an alloyed hot-dip galvanized layer contains, in mass %, Fe: 8 to 15% and Al: 0.08 to 0.50% with a balance being constituted of Zn and impurities, and the alloyed hot-dip galvanized steel sheet has a tensile strength of 540 MPa or more and has excellent bendability.

Patent Document 6 describes as a high-strength hot-dip galvanized steel sheet excellent in workability, one having a hot-dip galvanized layer on a base steel sheet containing, in mass %, C: 0.03 to 0.17%, Si: 0.01 to 0.75%, Mn: 1.5 to 2.5%, P: 0.080% or less, S: 0.010% or less, sol. Al: 0.01 to 1.20%, Cr: 0.3 to 1.3% with a balance being constituted of Fe and inevitable impurities, and having a steel structure constituted of, in volume fraction, 30 to 70% ferrite, less than 3% retained austenite, and martensite of the balance, in which 20% or more of the martensite is tempered martensite.

Patent Document 7 describes, as an ultra-high-strength cold-rolled steel sheet excellent in bending workability, a steel containing, by wt %, C: 0.12 to 0.30%, Si: 1.2% or less, Mn: 1 to 3%, P: 0.020% or less, S: 0.010% or less, sol. Al: 0.01 to 0.06% with a balance being constituted of Fe and inevitable impurities, the steel having a soft layer of C: 0.1 wt % or less in a surface layer part on both surfaces by 3 to 15 vol % per surface with a balance being constituted of a complex structure of retained austenite of less than 10 vol % and a low-temperature transformation phase or further ferrite.

PRIOR ART DOCUMENT

Patent Document

Patent Document 1: Japanese Laid-open Patent Publication No. 2007-16319
Patent Document 2: Japanese Laid-open Patent Publication No. 2009-215616
Patent Document 3: Japanese Laid-open Patent Publication No. 2009-270126
Patent Document 4: Japanese Laid-open Patent Publication No. 2010-59452
Patent Document 5: Japanese Laid-open Patent Publication No. 2010-65269
Patent Document 6: Japanese Laid-open Patent Publication No. 2010-70843
Patent Document 7: Japanese Laid-open Patent Publication No. H5-195149

DISCLOSURE OF THE INVENTION

Problems to be Solved by the Invention

However, the conventional technologies are not able to obtain sufficient bendability when bending is performed on a high-strength galvanized steel sheet, and thus further improvement of bendability has been required.

In view of the above situations, the present invention provides a high-strength galvanized steel sheet having excellent bendability and a manufacturing method thereof.

Means for Solving the Problems

The present inventors have conducted intensive studies in order to obtain a high-strength galvanized steel sheet with maximum tensile strength of 900 MPa or more by which excellent bendability can be obtained by preventing all of crack inside a steel sheet which is a base material, necking in an interface between a steel sheet surface and a plating layer, and destruction and peeling of the plating layer, which occur in a deformation part by performing bending. As a result, the present inventors found that it may be a high-strength galvanized steel sheet having an alloyed galvanized layer with an iron content of 8 to 12% formed on a surface of a base steel sheet having predetermined chemical components, in which in a base steel sheet structure, retained austenite is limited to 8% or less in volume fraction, kurtosis K* of hardness distribution, which will be described later, is −0.30 or less, and a ratio between Vickers hardness of surface layer and Vickers hardness of ¼ thickness "(Vickers hardness of surface layer)/(Vickers hardness of ¼ thickness)" is 0.35 to 0.70.

Specifically, although such a high-strength galvanized steel sheet has maximum tensile strength of 900 MPa or more, the Vickers hardness of surface layer of the base steel sheet is low compared to the Vickers hardness of ¼ thickness, the surface layer of the base steel sheet easily deforms when bending is performed, and moreover the retained austenite, which becomes a starting point of destruction, is limited to 8% or less in volume fraction in the base steel sheet structure. Thus, a crack does not easily occur in the inside of the base steel sheet.

Moreover, in such a high-strength galvanized steel sheet, since the kurtosis K* of hardness distribution is −0.30 or less and dispersion in distribution of hardness in the base steel sheet is small, there are less boundaries where regions which largely differ in hardness are in contact with each other, and a crack does not easily occur in the inside of the base steel sheet when bending is performed.

Further, in such a high-strength galvanized steel sheet, since the Vickers hardness of surface layer of the base steel sheet is low compared to the Vickers hardness of ¼ thickness and ductility of the surface layer of the base steel sheet is excellent, necking is prevented on the base steel sheet side in the interface between the surface of the base steel sheet and the alloyed galvanized layer when bending is performed, and thus necking does not easily occur in the interface between the surface of the base steel sheet and the alloyed galvanized layer.

Further, in such a high-strength galvanized steel sheet, the content of iron of the alloyed galvanized layer is 8 to 12%, and adhesion in the interface between the surface of the base steel sheet and the alloyed galvanized layer is excellent. Thus, destruction and peeling of the alloyed galvanized layer do not easily occur when bending is performed.

The present invention was completed based on such knowledge, and the gist thereof is as follows.

(1)

A high-strength galvanized steel sheet excellent in bendability with maximum tensile strength of 900 MPa or more, including an alloyed galvanized layer formed on a surface of a base steel sheet containing, in mass %, C: 0.075 to 0.300%, Si: 0.30 to 2.50%, Mn: 1.30 to 3.50%, P: 0.001 to 0.050%, S: 0.0001 to 0.0100%, Al: 0.005 to 1.500%, N: 0.0001 to 0.0100%, and O: 0.0001 to 0.0100% with a balance being constituted of iron and inevitable impurities, wherein: retained austenite is limited to 8% or less in volume fraction in a range of ⅛ thickness to ⅜ thickness of the base steel sheet; when plural measurement regions with a diameter of 1 μm or less are set in the range of ⅛ thickness to ⅜ thickness of the base steel sheet, measurement values of hardness in the plural measurement regions are arranged in an ascending order to obtain a hardness distribution, an integer N0.02 is obtained, which is a number obtained by multiplying a total number of measurement values of hardness by 0.02 and rounding up this number when this number includes a fraction, hardness of a measurement value which is N0.02-th largest from a measurement value of minimum hardness is taken as 2% hardness, an integer N0.98 is obtained, which is a number obtained by multiplying a total number of measurement values of hardness by 0.98 and rounding down this number when this number includes a fraction, and hardness of a measurement value which is N0.98-th largest from a measurement value of minimum hardness is taken as 98% hardness, kurtosis K* of the hardness distribution between the 2% hardness and the 98% hardness is −0.30 or less; a ratio between Vickers hardness of surface layer of the base steel sheet and Vickers hardness of ¼ thickness of the base steel sheet is 0.35 to 0.70; and a content of iron in the alloyed galvanized layer is 8 to 12% in mass %.

(2)

The high-strength galvanized steel sheet excellent in bendability according to (1), wherein the structure of the base steel sheet contains, in volume fraction, 10 to 75% ferrite, 10 to 50% in total of either or both of bainitic ferrite and bainite, 10 to 50% tempered martensite in the range of ⅛ thickness to ⅜ thickness of the base steel sheet, the fresh martensite is limited to 15% or less in volume fraction, and perlite is limited to 5% or less in volume fraction.

(3)

The high-strength galvanized steel sheet excellent in bendability according to (1), wherein the base steel sheet further contains, in mass %, one or both of Ti: 0.005 to 0.150%, and Nb: 0.005 to 0.150%.

(4)

The high-strength galvanized steel sheet excellent in bendability according to (1), wherein the base steel sheet further contains, in mass %, one or more of B: 0.0001 to 0.0100%, Cr: 0.01 to 2.00%, Ni: 0.01 to 2.00%, Cu: 0.01 to 2.00%, Mo: 0.01 to 1.00%, and W: 0.01 to 1.00%.

(5)

The high-strength galvanized steel sheet excellent in bendability according to (1), wherein the base steel sheet further contains, in mass %, V: 0.005 to 0.150%.

(6)

The high-strength galvanized steel sheet excellent in bendability according to (1), wherein the base steel sheet further contains, 0.0001 to 0.5000 mass % in total of one or more of Ca, Ce, Mg, Zr, Hf, and REM.

The high-strength galvanized steel sheet excellent in bendability according to (1), wherein either or both of a coating film constituted of a phosphorus oxide and a coating film constituted of a composite oxide containing phosphorus is or are formed on a surface of the alloyed galvanized layer.

A manufacturing method of a high-strength galvanized steel sheet excellent in bendability, the method including: a hot-rolling step of heating to 1050° C. or more a slab containing, in mass %, C: 0.075 to 0.300%, Si: 0.30 to 2.50%, Mn: 1.30 to 3.50%, P: 0.001 to 0.050%, S: 0.0001 to 0.0100%, Al: 0.005 to 1.500%, N: 0.0001 to 0.0100%, and O: 0.0001 to 0.0100% with a balance being constituted of iron and inevitable impurities, completing hot rolling at a finish hot-rolling temperature of 880° C. or more, and coiling in a temperature region of 750° C. or less; a continuous annealing step of heating the steel sheet in a temperature range between 600° C. and $Ac_1$ transformation point at an average heating rate of 1° C. or more, retaining the steel sheet for 20 seconds to 600 seconds at an annealing temperature between ($Ac_1$ transformation point+40)° C. and $Ac_3$ transformation point and in an atmosphere in which log(water partial pressure/hydrogen partial pressure) is −3.0 to 0.0, performing bending-unbending deformation processing two or more times using a roll with a radius of 800 mm or less so as to make a difference in accumulated strain amount between a front and rear surface be 0.0050 or less, thereafter cooling the steel sheet in the temperature range of 740° C. to 650° C. at an average cooling rate of 1.0 to 5.0° C./second, and cooling the steel sheet in the temperature range of 650° C. to 500° C. at an average cooling rate of 5 to 200° C./second; and a plating alloying step of performing an alloying treatment including dipping the steel sheet after the continuous annealing step in a galvanizing bath, and then retaining the steel sheet at a temperature of 470 to 650° C. for 10 to 120 seconds.

(9)

The manufacturing method of the high-strength galvanized steel sheet excellent in bendability according to (8), wherein after the hot-rolling step and before the continuous annealing step, a cold-rolling step of cold rolling with a reduction ratio of 30 to 75% is performed.

(10)

The manufacturing method of the high-strength galvanized steel sheet excellent in bendability according to (8), wherein after the alloying treatment step, the steel sheet is retained at a temperature of 200 to 350° C. for 30 to 1000 seconds.

(11)

The manufacturing method of the high-strength galvanized steel sheet excellent in impact resistance characteristic according to (8), wherein after the alloying treatment step, a step of adding a coating film constituted of a phosphorus oxide and/or a composite oxide containing phosphorus is performed.

Effect of the Invention

According to the present invention, a high-strength galvanized steel sheet excellent in bendability with maximum tensile strength of 900 MPa or more and a manufacturing method thereof can be provided.

BEST MODE FOR CARRYING OUT THE INVENTION

A high-strength galvanized steel sheet of the present invention is a high-strength galvanized steel sheet with tensile strength of 900 MPa or more, including an alloyed galvanized layer formed on a surface of a base steel sheet containing, in mass %, C: 0.075 to 0.300%, Si: 0.30 to 2.50%, Mn: 1.30 to 3.50%, P: 0.001 to 0.050%, S: 0.0001 to 0.0100%, Al: 0.005 to 1.500%, N: 0 to 0.0100%, O: 0 to 0.0100% with a balance being constituted of iron and inevitable impurities.

(Chemical Components of the Base Steel Sheet)

First, chemical components (composition) of the base steel sheet constituting the high-strength galvanized steel sheet of the present invention will be described. Note that [%] in the following description is [mass %].

"C: 0.075 to 0.300%"

C is contained for increasing strength of the base steel sheet. However, when the content of C exceeds 0.300%, weldability becomes insufficient. In view of weldability, the content of C is preferably 0.250% or less, more preferably 0.220% or less. On the other hand, when the content of C is less than 0.075%, the strength decreases and it is not possible to ensure the maximum tensile strength of 900 MPa or more. In order to increase the strength, the content of C is preferably 0.090% or more, more preferably 0.100% or more.

"Si: 0.30 to 2.50%"

Si is an element which suppresses generation of iron-based carbide in the base steel sheet, and is necessary for increasing strength and formability. Further, it is also an element which improves stretch flangeability because it increases hardness of surface layer of the base steel sheet as a solid-solution strengthening element. However, when the content of Si exceeds 2.50%, the base steel sheet becomes brittle and ductility deteriorates. In view of ductility, the content of Si is preferably 2.20% or less, more preferably 2.00% or less. On the other hand, when the content of Si is less than 0.30%, a large amount of coarse iron-based carbides is generated during an alloying treatment of the alloyed galvanized layer, deteriorating strength and formability. In view of this, the lower limit value of Si is preferably 0.50% or more, more preferably 0.70% or more.

"Mn: 1.30 to 3.50%"

Mn is contained for increasing strength of the base steel sheet. However, when the content of Mn exceeds 3.50%, a coarse Mn concentrated portion occurs in a sheet thickness center portion of the base steel sheet, embrittlement occurs easily, and a trouble such as breaking of a cast slab occurs easily. Further, when the content of Mn exceeds 3.50%, weldability also deteriorates. Therefore, the content of Mn needs to be 3.50% or less. In view of weldability, the content of Mn is preferably 3.20% or less, more preferably 3.00% or less. On the other hand, when the content of Mn is less than 1.30%, a large amount of soft structures is formed during cooling after annealing, and thus it becomes difficult to ensure the maximum tensile strength of 900 MPa or more. Thus, the content of Mn needs to be 1.30% or more. The content of Mn is, for further increasing the strength, preferably 1.50% or more, more preferably 1.70% or more.

"P: 0.001 to 0.050%"

P tends to segregate in the sheet thickness center portion of the base steel sheet, and embrittles a weld zone. When the content of P exceeds 0.050%, the weld zone becomes quite brittle, and thus the content of P is limited to 0.50% or less. Although effects of the present invention are exhibited without particularly setting the lower limit of the content of P, setting the content of P to less than 0.001% accompanies large increase in manufacturing costs, and thus 0.001% is set as the lower limit value.

"S: 0.0001 to 0.0100%"

S adversely affects weldability and manufacturability during casting and hot rolling. Thus, the upper limit value of the content of S is set to 0.0100% or less. Further, S couples with Mn to form coarse MnS and decreases ductility and stretch flangeability. Thus, it is preferably 0.0050% or less, more preferably 0.0025% or less. Effects of the present invention are exhibited without particularly setting the lower limit of the content of S. However, setting the content of S to less than 0.0001% accompanies large increase in manufacturing costs, and thus 0.0001% is set as the lower limit value.

"Al: 0.005 to 1.500%"

Al suppresses generation of iron-based carbide to increase strength and formability of the base steel sheet. However, when the content of Al exceeds 1.500%, weldability worsens, and thus the upper limit of Al content is set to 1.500%. In view of this, the content of Al is preferably 1.200% or less, more preferably 0.900% or less. Further, although Al is an effective element as a deoxidizing material, when the content of Al is less than 0.005%, the effect as the deoxidizing material cannot be obtained sufficiently, and thus the lower limit of the content of Al is 0.005% or more. To obtain the deoxidizing effect sufficiently, the content of Al is preferably 0.010% or more.

"N: 0.0001 to 0.0100%"

N forms a coarse nitride and deteriorates ductility and stretch flangeability, and thus its added amount should be suppressed. When the content of N exceeds 0.0100%, this tendency becomes significant, and thus the range of N content is set to 0.0100% or less. Further, N causes generation of blow hole during welding, and thus a smaller amount is better. Although effects of the present invention are exhibited without particularly setting the lower limit of the content of N, setting the content of N to less than 0.0001% accompanies large increase in manufacturing costs, and thus 0.0001% is set as the lower limit value.

"O: 0.0001 to 0.0100%"

O forms an oxide and deteriorates ductility and stretch flangeability, and thus its content needs to be suppressed. When the content of O exceeds 0.0100%, deterioration of stretch flangeability becomes significant, and thus the upper limit of O content is set to 0.0100% or less. The content of O is preferably 0.0080% or less, more preferably 0.0060% or less. Although effects of the present invention are exhibited without particularly setting the lower limit of the content of O, setting the content of O to less than 0.0001% accompanies large increase in manufacturing costs, and thus 0.0001% is set as the lower limit.

The base steel sheet forming the high-strength galvanized steel sheet of the present invention may further contain the following elements as necessary.

"Ti: 0.005 to 0.150%"

Ti is an element which contributes to strength increase of the base steel sheet by precipitate strengthening, fine grain strengthening by growth suppression of ferrite crystal grains, and dislocation strengthening through suppression of recrystallization. However, when the content of Ti exceeds 0.150%, precipitation of the carbonitride increases and formability deteriorates, and thus the content of Ti is preferably 0.150% or less. In view of formability, the content of Ti is more preferably 0.100% or less, furthermore preferably 0.070% or less. Although effects of the present invention are exhibited without particularly setting the lower limit of the content of Ti, the content of Ti is preferably 0.005% or more so as to sufficiently obtain the strength increasing effect of Ti. To increase strength of the base steel sheet, the content of Ti is more preferably 0.010% or more, furthermore preferably 0.015% or more.

"Nb: 0.005 to 0.150%"

Nb is an element which contributes to strength increase of the base steel sheet by precipitate strengthening, fine grain strengthening by growth suppression of ferrite crystal grains, and dislocation strengthening through suppression of recrystallization. However, when the content of Nb exceeds 0.150%, precipitation of the carbonitride increases and formability deteriorates, and thus the content of Nb is preferably 0.150% or less. In view of formability, the content of Nb is more preferably 0.100% or less, furthermore preferably 0.060% or less. Although effects of the present invention are exhibited without particularly setting the lower limit of the content of Nb, the content of Nb is preferably 0.005% or more so as to sufficiently obtain the strength increasing effect of Nb. To increase strength of the base steel sheet, the content of Nb is preferably 0.010% or more, furthermore preferably 0.015% or more.

"B: 0.0001 to 0.0100%"

B suppresses phase transformation at high temperature and is an element effective for increasing strength, and may be added in place of part of C and/or Mn. When the content of B exceeds 0.0100%, workability during hot working is impaired and productivity decreases. Thus, the content of B is preferably 0.0100% or less. In view of productivity, the content of B is more preferably 0.0050% or less, furthermore preferably 0.0030% or less. Although effects of the present invention are exhibited without particularly setting the lower limit of the content of B, the content of B is preferably 0.0001% or more so as to sufficiently obtain the effect of strength increase by B. To increase strength, the content of B is preferably 0.0003% or more, furthermore preferably 0.0005% or more.

"Cr: 0.01 to 2.00%"

Cr suppresses phase transformation at high temperature and is an element effective for increasing strength, and may be added in place of part of C and/or Mn. When the content of Cr exceeds 2.00%, workability during hot working is impaired and productivity decreases, and thus the content of Cr is preferably 2.00% or less. Although effects of the present invention are exhibited without particularly setting the lower limit of the content of Cr, the content of Cr is preferably 0.01% or more so as to sufficiently obtain the effect of strength increase by Cr.

"Ni: 0.01 to 2.00%"

Ni suppresses phase transformation at high temperature and is an element effective for increasing strength, and may be added in place of part of C and/or Mn. When the content of Ni exceeds 2.00%, weldability is impaired, and thus the content of Ni is preferably 2.00% or less. Although effects of the present invention are exhibited without particularly setting the lower limit of the content of Ni, the content of Ni is preferably 0.01% or more so as to sufficiently obtain the effect of strength increase by Ni.

"Cu: 0.01 to 2.00%"

Cu is an element which increases strength by existing as fine particles in steel, and can be added in place of part of C and/or Mn. When the content of Cu exceeds 2.00%, weldability is impaired, and thus the content of Cu is preferably 2.00% or less. Although effects of the present invention are exhibited without particularly setting the lower limit of the content of Cu, the content of Cu is preferably 0.01% or more so as to sufficiently obtain the effect of strength increase by Cu.

"Mo: 0.01 to 1.00%"

Mo suppresses phase transformation at high temperature and is an element effective for increasing strength, and may be added in place of part of C and/or Mn. When the content of Mo exceeds 1.00%, workability during hot working is impaired and productivity decreases. Thus, the content of Mo is preferably 1.00% or less. Although effects of the present invention are exhibited without particularly setting the lower limit of the content of Mo, the content of Mo is preferably 0.01% or more so as to sufficiently obtain the effect of strength increase by Mo.

"W: 0.01 to 1.00%"

W suppresses phase transformation at high temperature and is an element effective for increasing strength, and may be added in place of part of C and/or Mn. When the content of W exceeds 1.00%, workability during hot working is impaired and productivity decreases, and thus the content of W is preferably 1.00% or less. Although effects of the present invention are exhibited without particularly setting the lower limit of the content of W, the content of W is preferably 0.01% or more so as to sufficiently obtain the effect of strength increase by W.

"V: 0.005 to 0.150%"

V is an element which contributes to strength increase of the base steel sheet by precipitate strengthening, fine grain strengthening by growth suppression of ferrite crystal grains, and dislocation strengthening through suppression of recrystallization. However, when the content of V exceeds 0.150%, precipitation of the carbonitride increases and formability deteriorates, and thus the content of V is preferably 0.150% or less. Although effects of the present invention are exhibited without particularly setting the lower limit of the content of V, the content of V is preferably 0.005% or more so as to sufficiently obtain the strength increasing effect of V.

"0.0001 to 0.5000% in Total of One or More of Ca, Ce, Mg, Zr, Hf, REM"

Ca, Ce, Mg, Zr, Hf, REM are elements effective for improving formability, and one or more of them may be added. However, when a total content of one or more of Ca, Ce, Mg, Zr, Hf, REM exceeds 0.5000%, it is possible that ductility is impaired on the contrary. Accordingly, the total content of the elements is preferably 0.5000% or less. Although effects of the present invention are exhibited without particularly setting the lower limit of the total content of one or more of Ca, Ce, Mg, Zr, Hf, REM, the total content of these elements is preferably 0.0001% or more so as to sufficiently obtain the effect of improving formability of the base steel sheet. In view of formability, the total content of one or more of Ca, Ce, Mg, Zr, Hf, REM is more preferably 0.0005% or more, furthermore preferably 0.0010% or more.

Note that REM stands for Rare Earth Metal, and refers to an element belonging to the lanthanoid series. In the present invention, REM or Ce is often added in misch metal, and may contain elements of the lanthanoid series other than La and Ce in a complex form. Effects of the present invention are exhibited even when elements of the lanthanoid series other than La and Ce are contained as inevitable impurities. Further, effects of the present invention are exhibited even when metals La and Ce are added.

(Structure of the Base Steel Sheet)

The reasons for defining the structure of the base steel sheet of the high-strength galvanized steel sheet of the present invention are as follows.

"Retained Austenite: 8% or Less"

In the structure of the base steel sheet, retained austenite is limited to 8% or less in volume fraction in the range of ⅛ thickness to ⅜ thickness of the base steel sheet.

Retained austenite largely improves strength and ductility, but on the other hand, it becomes a starting point of destruction and largely deteriorates bendability. Accordingly, in the high-strength galvanized steel sheet of the present invention, retained austenite contained in the structure of the base steel sheet is limited to 8% or less in volume fraction. To further improve bendability of the high-strength galvanized base steel sheet, the volume fraction of retained austenite is preferably 5% or less.

Note that in the entire structure of the base steel sheet, the retained austenite is desirably limited to 8% or less in volume fraction. However, the metal structure in the range of ⅛ thickness to ⅜ thickness with ¼ of the sheet thickness of the base steel sheet being the center represents the structure of the entire base steel sheet. Therefore, when the retained austenite is limited to 8% or less in volume fraction in the range of ⅛ thickness to ⅜ thickness of the base steel sheet, it can be assumed that the retained austenite is substantially limited to 8% or less in volume fraction in the entire structure of the base steel sheet. Accordingly, in the present invention, the range of volume fraction of retained austenite in the range of ⅛ thickness to ⅜ thickness of the base steel sheet is defined.

Besides that the above-described retained austenite is limited to 8% or less in volume fraction, the structure of the base steel sheet of the high-strength galvanized steel sheet of the present invention preferably contains, in volume fraction, 10 to 75% ferrite, 10 to 50% in total of either or both of bainitic ferrite and bainite, and 10 to 50% tempered martensite in the range of ⅛ thickness to ⅜ thickness with ¼ of the sheet thickness being the center. Further, preferably, the fresh martensite is limited to 15% or less in volume fraction, and perlite is limited to 5% or less in volume fraction. When the base steel sheet of the high-strength galvanized steel sheet of the present invention has such structure, kurtosis $K^*$ of a hardness distribution which will be described later becomes −0.30 or less, making it be a high-strength galvanized steel sheet having more excellent bendability.

Note that similarly the metal structure of these ferrite and so on is desirably in a predetermined range in the entire structure of the base steel sheet. However, the metal structure in the range of ⅛ thickness to ⅜ thickness with ¼ of the sheet thickness of the base steel sheet being the center represents the entire structure of the base steel sheet. Therefore, when 10 to 75% ferrite, 10 to 50% in total of either or both of bainitic ferrite and bainite, and 10 to 50% tempered martensite in volume fraction are contained in the range of ⅛ thickness to ⅜ thickness of the base steel sheet, fresh martensite is limited to 15% or less in volume fraction, and perlite is limited to 5% or less in volume fraction, it can be assumed that the metal structure of these ferrite and so on is substantially in a predetermined range in the entire structure of the base steel sheet. Accordingly, in the present invention, the range of volume fraction of the metal structure of these ferrite and so on is defined in the range of ⅛ thickness to ⅜ thickness of the base steel sheet.

"Ferrite: 10 to 75%"

Ferrite is a structure effective for improving ductility, and is contained preferably by 10 to 75% in volume fraction in the structure of the base steel sheet. When the volume fraction of ferrite is less than 10%, it is possible that sufficient ductility is not obtained. The volume fraction of ferrite contained in the structure of the base steel sheet is more preferably 15% or more, furthermore preferably 20% or more in view of ductility. Further, since ferrite has a soft structure, when its volume fraction exceeds 75%, it is possible that sufficient strength cannot be obtained. To sufficiently increase tensile strength of the base steel sheet, the volume fraction of ferrite contained in the structure of the base steel sheet is preferably 65% or less, more preferably 50% or less.

"Perlite: 5% or Less"

When there is a large amount of perlite, ductility deteriorates. Thus, the volume fraction of perlite contained in the structure of the base steel sheet is preferably limited to 5% or less, more preferably 2% or less.

"10 to 50% in Total of Either or Both of Bainitic Ferrite and Bainite"

Bainitic ferrite and bainite have a structure excellent in balance between strength and ductility, and preferably 10 to 50% bainitic ferrite and bainite in total in volume fraction are contained in the structure of the base steel sheet. Further, bainitic ferrite and bainite have a microstructure having strength which is in the middle between soft ferrite and hard martensite, and tempered martensite and retained austenite, and they are preferably contained by 15% or more in total, more preferably 20% or more in total in view of bendability. On the other hand, when the volume fraction of bainitic ferrite and bainite exceeds 50% in total, yield stress increases excessively and shape fixability deteriorates, which is hence not preferable. Note that only one of bainitic ferrite and bainite may be contained, or both of them may be contained.

"Fresh Martensite: 15% or Less"

The fresh martensite largely improves tensile strength, but on the other hand, it becomes a starting point of destruction and largely deteriorates bendability. Accordingly, they are preferably limited to 15% or less in volume fraction in the structure of the base steel sheet. To increase bendability, the volume fraction of fresh martensite is more preferably 10% or less, furthermore preferably 5% or less.

"Tempered Martensite: 10 to 50%"

Tempered martensite has a structure which largely improves tensile strength, and may be contained by 50% or less in volume fraction in the structure of the base steel sheet. In view of tensile strength, the volume fraction of tempered martensite is preferably 10% or more. On the other hand, when the volume fraction of tempered martensite contained in the structure of the base steel sheet exceeds 50%, yield stress increases excessively and there is a concern of deteriorating shape fixability, which is hence not preferable.

"Other Structure"

The structure of the base steel sheet of the high-strength galvanized steel sheet of the present invention may contain a structure such as coarse cementite other than the above-described structures. However, when there is a large amount of coarse cementite in the structure of the base steel sheet, bendability deteriorates. Thus, the volume fraction of coarse cementite contained in the structure of the base steel sheet is preferably 10% or less, more preferably 5% or less.

The volume fractions of respective structures contained in the structure of the base steel sheet of the high-strength galvanized steel sheet of the present invention can be measured by, for example, the following method.

Regarding the volume fraction of retained austenite, X-ray diffraction is performed on an observation surface which is a surface in parallel to a sheet surface of the base steel sheet and at ¼ thickness, and an area fraction is calculated, which can then be assumed as the volume fraction.

Regarding the volume fractions of ferrite, perlite, bainitic ferrite, bainite, tempered martensite, and fresh martensite contained in the structure of the base steel sheet of the high-strength galvanized steel sheet of the present invention, a sample is collected from an observation surface which is a thicknesswise cross section perpendicular to a sheet surface of the base steel sheet and in parallel with a rolling direction (rolling reduction direction), the observation surface is polished and nital etched, the range of ⅛ thickness to ⅜ thickness with ¼ of the sheet thickness being the center is observed with a field emission scanning electron microscope (FE-SEM), and area fractions of respective structures are measured, which can be assumed as the volume fractions of respective structures.

As described above, since the metal structure in the range of ⅛ thickness to ⅜ thickness with ¼ of the sheet thickness of the base steel sheet being the center represents the structure of the entire base steel sheet, the metal structure of the entire structure of the base steel sheet can be recognized by using the volume fraction of retained austenite at ¼ thickness of the base steel sheet and the volume fractions of metal structures, such as a metal structure of ferrite, and so on, in the range of ⅛ thickness to ⅜ thickness of the base steel sheet.

Ferrite is a mass of crystal grains and is a region where there is no iron-based carbide with a major axis of 100 nm or more in its inside. Note that the volume fraction of ferrite is the sum of the volume fractions of ferrite remaining at the maximum heating temperature and ferrite newly generated in a ferrite transformation temperature region.

Bainitic ferrite is an aggregation of lath-shaped crystal grains which contains no iron-based carbide with a major axis of 20 nm or more in the inside of the lath.

Bainite is an aggregation of lath-shaped crystal grains which has plural iron-based carbides with a major axis of 20 nm or more in the inside of the lath, and these carbides further belong to a single variant, that is, iron-based carbide group extending in the same direction. Here, the iron-based carbide group extending in the same direction means ones having a difference of 5° or less in stretch direction of the iron-based carbide group.

Tempered martensite is an aggregation of lath-shaped crystal grains which has plural iron-based carbides with a major axis of 20 nm or more in the inside of the lath, and these carbides further belong to plural variants, that is, plural iron-based carbide groups extending in different directions.

Note that bainite and tempered martensite can be distinguished easily by observing iron-based carbides in lath-shaped crystal grains by using the FE-SEM and checking stretch directions thereof.

Further, fresh martensite and retained austenite are not corroded sufficiently by nital etching. Therefore, they are distinguished clearly from the above-described structures (ferrite, bainitic ferrite, bainite, tempered martensite) in observation with the FE-SEM.

Therefore, the volume fraction of fresh martensite is obtained as a difference between the area fraction of a non-corroded region observed with the FE-SEM and the area fraction of retained austenite measured with X-rays.

(Kurtosis K* of Hardness Distribution)

In the high-strength galvanized steel sheet of the present invention, kurtosis K* in the hardness distribution of a predetermined range of the base steel sheet is −0.30 or less. Here, the hardness distribution in the high-strength galvanized steel sheet of the present invention is defined as follows. Specifically, plural measurement regions with a diameter of 1 μm or less are set in the range of ⅛ thickness to ⅜ thickness of the base steel sheet, and hardness in the plural measurement regions is measured. Then, measurement values of the respective measurement regions are arranged in an ascending order to obtain the hardness distribution. Then, an integer N0.02 is obtained, which is a number obtained by multiplying a total number of measurement values of hardness by 0.02 and rounding up this number when it includes a fraction. Then, hardness of a measurement value which is the N0.02-th largest from a measurement value of minimum hardness is taken as 2% hardness. Further, an integer N0.98 is obtained, which is a number obtained by multiplying a total number of measurement values of hardness by 0.98 and rounding down this number when it includes a fraction. Then, hardness of a measurement value which is the N0.98-th largest from a measurement value of minimum hardness is taken as 98% hardness. Then, in the high-strength galvanized steel sheet of the present invention, the kurtosis K* in the hardness distribution between the 2% hardness and the 98% hardness is set in the range below −0.30 or less.

Specifically, for example, when measurement regions with a diameter of 1 μm or less are set at 1000 positions in the range of ⅛ thickness to ⅜ thickness of the base steel sheet, and hardness is measured in measurement regions at these 1000 points, "the total number of measurement values of hardness" is 1000. Then, the hardness distribution can be obtained by arranging the measurement values of hardness measured in the respective measurement regions at these 1000 points in an ascending order.

In this case, a number resulting from multiplying the total number of measurement values of hardness (that is, 1000) by 0.02 (=20) is the "integer N0.02". Then, in the obtained hardness distribution, the hardness of the N0.02-th (that is, 20th) largest measurement value from the measurement value of minimum hardness is 2% hardness.

Further, similarly, a number resulting from multiplying the total number of measurement values of hardness (that is, 1000) by 0.98 (=980) is the "integer N0.98". Then, in the obtained hardness distribution, the hardness of the N0.98-th (that is, 980th) largest measurement value from the measurement value of minimum hardness is 98% hardness.

Note that although the case where the total number of measurement values of hardness is 1000 has been described, when the total number of measurement values of hardness is 2000 (that is, when hardness is measured at 2000 points), the "integer N0.02" is 40 and the "integer N0.98" is 1960. Then, the hardness of the 40-th largest measurement value from the measurement value of minimum hardness is 2% hardness, and the hardness of the 1960-th largest measurement value is 98% hardness.

Further, when the "integer N0.02" is obtained by the above-described procedure, if the number obtained by multiplying by 0.02 includes a fraction, a number obtained by rounding up after the decimal point is the "integer N0.02". Similarly, when the "integer N0.98" is obtained, if the number obtained by multiplying by 0.98 includes a fraction, a number obtained by rounding up after the decimal point is the "integer N0.98".

Here, the "hardness" used for hardness distribution in the present invention means a measurement value measured by the following method. Specifically, a dynamic micro hardness tester having a Berkovich type triangular pyramid indenter is used to measure hardness by push-in depth measurement method with a push-in load of 1 g weight. Note that the measurement position of hardness is in the range of ⅛ thickness to ⅜ thickness of the base steel sheet with ¼ of the sheet thickness being the center in the thicknesswise cross section in parallel with the rolling direction of the base steel sheet. Further, the total number of measurement values of hardness is in the range of 100 to 10000, preferably 1000 or more.

In the high-strength galvanized steel sheet of the present invention, the above-described kurtosis K* of hardness distribution between 2% hardness and 98% hardness is −0.30 or less, and there is a small dispersion in distribution of hardness in the base steel sheet. Therefore, a boundary where regions which differ largely in hardness are in contact with each other decreases, and excellent bendability can be obtained. To obtain more excellent bendability, the kurtosis K* is preferably −0.40 or less, more preferably −0.50 or less. Although effects of the present invention are exhibited without particularly setting the lower limit of the kurtosis K*, it is difficult from experiences to make K* be −1.20 or less, which is hence set as the lower limit. However, in the high-strength galvanized steel sheet of the present invention, this kurtosis K* may be more than −0.40, and for example, may be about −0.35 to −0.38.

Note that the kurtosis K* is a number obtained with the following equation from data of measurement values of hardness in plural measurement regions, and is a value evaluated by comparing a frequency distribution of data with a normal distribution. When the kurtosis becomes a negative value, it represents that a frequency distribution curve of data is relatively flat and means that the larger the absolute value thereof, the more it deviates from the normal distribution.

$$K^* + \left\{ \frac{(N_{0.98} - N_{0.02} + 1)(N_{0.98} - N_{0.02} + 2)}{(N_{0.98} - N_{0.02})(N_{0.98} - N_{0.02} - 1)(N_{0.98} - N_{0.02} - 2)} \right\} \quad \text{[Equation 1]}$$

$$\sum_{i=N_{0.02}}^{N_{0.98}} \left( \frac{H_i H_*}{s^*} \right)^4 - \frac{3(N_{0.98} - N_{0.02})^2}{(N_{0.98} - N_{0.02} - 1)(N_{0.98} - N_{0.02} - 2)}$$

Note that in the above equation, Hi indicates hardness of the i-th largest measurement point from the measurement value of minimum hardness, H* indicates average hardness from the N0.02-th largest measurement point to the N0.98-th largest measurement point from the minimum hardness, and s* indicates a standard deviation from the N0.02-th largest measurement point to the N0.98-th largest measurement point from the minimum hardness.

(Ratio of Vickers Hardness Between Surface Layer and ¼ Thickness of the Base Steel Sheet)

Further, in the high-strength galvanized steel sheet of the present invention, a ratio between Vickers hardness of surface layer of the base steel sheet and Vickers hardness of ¼ thickness of the base steel sheet "(Vickers hardness of surface layer)/(Vickers hardness of ¼ thickness)" is 0.35 to 0.70. Note that in the present invention, the "Vickers hardness of surface layer of the base steel sheet" means the Vickers hardness at the point entering the base steel sheet side by 10 μm from the interface between a surface of the base steel sheet and the alloyed galvanized layer.

The Vickers hardness of surface layer of the base steel sheet and Vickers hardness of ¼ thickness of the base steel sheet can be measured by a method which will be described below. Specifically, Vickers hardness is measured at five points separated by 1 mm or more from each other in the rolling direction of the base steel sheet at each of the point entering the base steel sheet side by 10 μm from the interface between the surface of the base steel sheet and the alloyed galvanized layer and the point of ¼ thickness of the base steel sheet, the maximum value and the minimum value are discarded, and the average value of remaining three positions is employed. In the measurement of Vickers hardness, the load is 100 gf.

In the high-strength galvanized steel sheet of the present invention, since the ratio between the Vickers hardness of surface layer of the base steel sheet and Vickers hardness of ¼ thickness of the base steel sheet is in the above-described range, the Vickers hardness of surface layer of the base steel sheet is sufficiently low as compared to the Vickers hardness of ¼ thickness, and the surface layer of the base steel sheet has a microstructure excellent in ductility. Accordingly, necking on the base steel sheet side in the interface between the surface of the base steel sheet and the alloyed galvanized layer in the case where bending of the high-strength galvanized steel sheet is performed is prevented, and necking in the interface between the surface of the base steel sheet and the alloyed galvanized layer does not easily occur.

When the ratio between the Vickers hardness of surface layer of the base steel sheet and the Vickers hardness of ¼ thickness of the base steel sheet exceeds 0.70, the surface layer of the base steel sheet is hard and necking in the surface of the base steel sheet cannot be prevented sufficiently, which hence results in insufficient bendability. To obtain more excellent bendability, the ratio between the Vickers hardness of surface layer of the base steel sheet and the Vickers hardness of ¼ thickness of the base steel sheet is preferably 0.60 or less. Further, when the ratio between the Vickers hardness of surface layer of the base steel sheet and the Vickers hardness of ¼ thickness of the base steel sheet is less than 0.35, stretch flangeability deteriorates. To obtain good stretch flangeability, the ratio between the Vickers hardness of surface layer of the base steel sheet and the Vickers hardness of ¼ thickness of the base steel sheet is preferably 0.38 or more.

(Alloyed Galvanized Layer)

On the high-strength galvanized steel sheet of the present invention, an alloyed galvanized layer is formed on the surface of the base steel sheet. A main body of the alloyed galvanized layer is an Fe—Zn alloy formed by diffusion of Fe in steel in the zinc plating by alloying reaction, and the content of iron in the alloyed galvanized layer is 8 to 12% in mass %. In the present invention, since the content of iron in the alloyed galvanized layer is 8 to 12%, destruction and peeling of the alloyed galvanized layer can be prevented sufficiently when bending is performed on the high-strength galvanized steel sheet. The content of iron in the alloyed galvanized layer is 8.0% or more for ensuring good flaking resistance, and is preferably 9.0% or more. Further, the content of iron in the alloyed galvanized layer is 12.0% or less for ensuring good powdering resistance, and is preferably 11.0% or less. Further, the alloyed galvanized layer may contain Al as impurity.

The alloyed galvanized layer may contain one or more of Pb, Sb, Si, Sn, Mg, Mn, Ni, Cr, Co, Ca, Cu, Li, Ti, Be, Bi, Sr, I, Cs, REM, or they may be mixed therein. When the alloyed galvanized layer contains one or more of the above elements or have them mixed in, effects of the present invention are not impaired, and there may even be cases where they improve corrosion resistance, workability, and/or the like depending on their contents, and hence are preferable.

The coating weight of the alloyed galvanized layer is not particularly limited, but it is desirably 20 g/m$^2$ or more in view of corrosion resistance and 150 g/m$^2$ or less in view of economy. Further, an average thickness of the alloyed galvanized layer is 1.0 μm or more and 50 μm or less. When it is less than 1.0 μm, sufficient corrosion resistance cannot be obtained. Preferably, it is 2.0 μm or more. On the other hand, when it is more than 50.0 μm, strength of the steel sheet is impaired, which is hence not preferable. In view of raw material costs, the thickness of the alloyed galvanized layer is thinner the better, preferably 30.0 μm or less.

Moreover, either or both of a coating film constituted of a phosphorus oxide and a coating film constituted of a composite oxide containing phosphorus may be formed on the surface of the alloyed galvanized layer.

(Manufacturing Method)

Next, a method of manufacturing the high-strength galvanized steel sheet of the present invention will be described in detail.

To manufacture the high-strength galvanized steel sheet of the present invention, first, a steel sheet to be the base steel sheet is manufactured. To manufacture the steel sheet, first, a slab having the above-described chemical components (composition) is cast. Then, a hot-rolling step is performed, including heating to 1050° C. or more, completing hot rolling at a finish hot-rolling temperature of 880° C. or more, and coiling in a temperature region of 750° C. or less.

(Hot-Rolling Step)

As the slab to be subjected to the hot-rolling step, a continuously cast slab or a slab produced by a thin slab caster or the like can be used. The manufacturing method of the high-strength galvanized steel sheet of the present invention is compatible with a process like continuous casting-direct rolling (CC-DR) in which hot rolling is performed immediately after casting.

In the hot-rolling step, the slab heating temperature needs to be 1050° C. or more. When the slab heating temperature is excessively low, the finish rolling temperature becomes lower than an Ar$_3$ transformation point, and rolling with a two-phase region of ferrite and austenite is performed. Thus, a duplex grain structure with a heterogeneous hot-rolling structure is generated, and a heterogeneous structure will not be resolved even after undergoing cold-rolling step and continuous annealing step, resulting in a base steel sheet with poor ductility and bendability. Further, decrease in slab heating temperature leads to excessive increase in rolling load, and there are concerns of difficulty in rolling, causing a defective shape of the base steel sheet after rolling, and the like. Although effects of the present invention are exhibited without particularly setting the upper limit of the slab heating temperature, setting an excessively high heating temperature is not preferable in view of economy, and thus the upper limit of the slab heating temperature is desirably 1350° C. or less.

Note that the Ar$_3$ transformation point is calculated with the following formula.

$$Ar_3 = 901 - 325 \times C + 33 \times Si - 92 \times (Mn + Ni/2 + Cr/2 + Cu/2 + Mo/2) + 52 \times Al$$

In this formula, C, Si, Mn, Ni, Cr, Cu, Mo, Al represent the contents of respective elements [mass %]. When an element is not contained, it is calculated as 0.

Further, the finish hot-rolling temperature needs to be 880° C. or more. When the finish hot-rolling temperature is less than 880° C., the rolling load during the finishing rolling becomes high, and there are concerns of making the hot rolling difficult, causing a defective shape of the hot-rolled steel sheet to be obtained after hot rolling, and the like. Further, the finish hot-rolling temperature of hot rolling is preferably equal to or more than the Ar$_3$ transformation point. When the finish hot-rolling temperature is less than the Ar$_3$ transformation point, the hot rolling becomes two-phase rolling of ferrite and austenite, and the structure of the hot-rolled steel sheet may become a heterogeneous duplex grain structure.

On the other hand, although effects of the present invention are exhibited without particularly setting the upper limit of the finish hot-rolling temperature, when an excessively high finish hot-rolling temperature is set, the slab heating temperature must be set excessively high in order to ensure this temperature. Thus, the upper limit of the finish hot-rolling temperature is desirably 1000° C. or less.

To prevent excessive increase in thickness of the oxide formed on the surface of the hot-rolled steel sheet and deterioration of picklability property, a coiling temperature of 750° C. or less is set. To further increase picklability, the coiling temperature is preferably 720° or less, more preferably 700° C. or less.

On the other hand, when the coiling temperature is less than 500° C., strength of the hot-rolled steel sheet increases excessively and makes cold rolling difficult, and thus the coiling temperature is 500° C. or more. To reduce a cold-rolling load, the coiling temperature is preferably 550° C. or more, more preferably 600° C. or more.

Next, preferably, pickling of the hot-rolled steel sheet manufactured thus is performed. The pickling is to remove oxides on surfaces of the hot-rolled steel sheet, and hence is important for improving platability of the base steel sheet. Further, the pickling may be once or may be performed plural times separately.

(Cold-Rolling Step)

Although it is also possible to subject the hot-rolled steel sheet after pickling as is to a continuous annealing step, a cold-rolling step may be performed on the pickled hot-rolled steel sheet for the purpose of sheet thickness adjustment and/or shape correction. When the cold-rolling step is performed, a reduction ratio is preferably set in the range of 30 to 75% so as to obtain a base steel sheet having an excellent shape with high sheet thickness precision. When the reduction ratio is less than 30%, it is difficult to keep its shape flat, possibly resulting in bad ductility of the final product. The reduction ratio in the cold-rolling step is preferably 40% or more, more preferably 45% or more. On the other hand, in cold rolling with a reduction ratio of more than 75%, a cold-rolling load becomes too large and makes the cold rolling difficult. Thus, the reduction ratio is preferably 75% or less. In view of cold-rolling load, the reduction ratio is more preferably 70% or less.

Note that in the cold-rolling step, effects of the present invention are exhibited without particularly defining the number of times of cold-rolling pass and a reduction ratio of each rolling pass.

(Continuous Annealing Step)

Next, a continuous annealing step is performed in which the hot-rolled steel sheet obtained after the hot-rolling step or the cold-rolled steel sheet obtained after the cold-rolling step is passed through a continuous annealing line. In the continuous annealing step of the present invention, the steel sheet is heated in a temperature range between 600° C. and $Ac_1$ transformation point at an average heating rate of 1° C./second or more. Then, the steel sheet is retained for 20 seconds to 600 seconds at an annealing temperature between ($Ac_1$ transformation point+40)° C. and $Ac_3$ transformation point and in an atmosphere in which log(water partial pressure/hydrogen partial pressure) is −3.0 to 0.0, and bending-unbending deformation processing is applied two or more times to the steel sheet by using a roll with a radius of 800 mm or less, thereby performing a treatment so as to make a difference in accumulated strain amount between a front and rear surface be 0.0050 or less. Thereafter, the steel sheet is cooled in the temperature range of 740° C. to 650° C. at an average cooling rate of 1.0 to 5.0° C./second.

In the present invention, by performing the continuous annealing step, a distribution of C amount inside the hot-rolled steel sheet or the cold-rolled steel sheet is controlled, hardness inside the cold-rolled steel sheet is ensured, and meanwhile hardness of a surface layer is made moderately low.

In the continuous annealing step, first, the hot-rolled steel sheet obtained after the hot-rolling step or the cold-rolled steel sheet obtained after the cold-rolling step is heated at the average heating rate of 1° C./second or more in the temperature range between 600° C. and $Ac_1$ transformation point. When the temperature of the steel sheet becomes 600° or more, decarburization from the steel sheet begins. In the temperature range between 600° C. and $Ac_1$ transformation point, iron contained in the steel sheet is the same bcc iron in both inside and surface. In the present invention, the bcc iron is a generic name of ferrite, bainite, bainitic ferrite, and martensite having a body-centered cubic lattice.

In the temperature range between 600° C. and $Ac_1$ transformation point, since all the iron contained in the steel sheet is bcc iron, not only carbon in a surface layer of the steel sheet but also carbon in a center portion of the steel sheet can escape easily from an outermost layer. When the average heating rate in the temperature range between 600° C. and $Ac_1$ transformation point is less than 1° C./second, it takes a long time for the steel sheet to reach the $Ac_1$ transformation point from 600° C., and thus there is a possibility that the C amount escaping from the steel sheet in the temperature range between 600° C. and $Ac_1$ transformation point becomes too large, resulting in insufficient strength of the galvanized steel sheet. To ensure strength of the galvanized steel sheet, the average heating rate in the temperature range between 600° C. and $Ac_1$ transformation point is preferably 2° C./second or more. Although it would be no problem when the upper limit of the average heating rate between 600° C. and $Ac_1$ transformation point is not particularly defined, it is preferably 100° C./second or less in view of cost.

Thereafter, the steel sheet which have reached the $Ac_1$ transformation point is further heated, and the steel sheet is retained at an annealing temperature between ($Ac_1$ transformation point+40)° C. and $Ac_3$ transformation point and in an atmosphere in which log(water partial pressure/hydrogen partial pressure) is −3.0 to 0.0 for 20 seconds to 600 seconds, and bending-unbending deformation processing is applied two or more times to the steel sheet by using a roll with a radius of 800 mm or less, thereby performing annealing so as to make a difference in accumulated strain amount between a front and rear surface be 0.0050 or less.

In the temperature region (annealing temperature) between ($Ac_1$ transformation point+40)° C. and $Ac_3$ transformation point, the steel sheet is in a state that a microstructure in the surface layer of the steel sheet is bcc iron and a microstructure in the center portion of the steel sheet is austenite. As compared to bcc iron, more carbon can solid-dissolve in austenite. Accordingly, carbon does not easily diffuse from austenite to bcc iron, but easily defuses from bcc iron to the outside or to austenite. Therefore, at the annealing temperature, the carbon in the center portion of the steel sheet remains in the center portion, part of the carbon in the surface layer of the steel sheet diffuses to the center portion, and the rest escapes from the outermost layer. Thus, the steel sheet has, as a result, a distribution such that the carbon amount in the center portion is larger than in the surface layer.

When the annealing temperature is less than (Ac$_1$ transformation point+40)° C., carbon does not easily diffuse from bcc iron to the outside or austenite, and the distribution of C amount in the steel sheet does not become larger in the center portion than in the surface layer. Thus, the annealing temperature is preferably (Ac$_1$ transformation point+50)° C. or more, more preferably (Ac$_1$ transformation point+40)° C. or more. Further, when the annealing temperature exceeds the Ac$_3$ transformation point, the bcc iron cannot exist, hardness of the surface layer is difficult to control, and the volume fraction of retained austenite increases, thereby deteriorating bendability. Therefore, the annealing temperature is preferably (Ac3−10)° C. or less, more preferably (Ac3−15)° C. or less.

In the present invention, the atmosphere for performing annealing is set so that log(water partial pressure/hydrogen partial pressure) is −3.0 to 0.0. By making the logarithm of the ratio between water partial pressure and hydrogen partial pressure be −3.0 to 0.0, decarburization from the steel sheet surface layer by performing annealing is facilitated moderately. When the logarithm of the ratio between water partial pressure and hydrogen partial pressure is less than −3.0, decarburization from the steel sheet surface layer by performing annealing becomes insufficient. To facilitate decarburization, the logarithm of the ratio between water partial pressure and hydrogen partial pressure is preferably −2.5 or more. When the logarithm of the ratio between water partial pressure and hydrogen partial pressure is more than 0.0, decarburization from the steel sheet surface layer by performing annealing is facilitated excessively, and it is possible that strength of the base steel sheet of the galvanized steel sheet becomes insufficient. To ensure strength of the base steel sheet, the logarithm of the ratio between water partial pressure and hydrogen partial pressure is preferably −0.5 or less. Further, preferably, the atmosphere for performing annealing includes nitrogen, water vapor, and hydrogen and is mainly constituted of nitrogen, and oxygen may be contained besides nitrogen, water vapor, and hydrogen.

In the present invention, retention time in the annealing temperature and the atmosphere described above is 20 seconds to 600 seconds. When the retention time is less than 20 seconds, the amount of carbon diffusing from bcc iron to the outside or austenite becomes insufficient. To ensure the amount of carbon diffusing from bcc iron, the retention time is preferably 35 seconds or more, more preferably 50 seconds or more. Further, when the retention time exceeds 600 seconds, the amount of carbon escaping from the outermost layer becomes large, and hardness of the surface layer decreases excessively. To ensure hardness of the surface layer, the retention time is preferably 450 seconds or less, more preferably 300 seconds or less.

When performing annealing, bending-unbending deformation processing is performed two or more times by using a roll with a radius of 800 mm or less at the annealing temperature and in the above atmosphere, so as to make a difference in accumulated strain amount between a front and rear surface be 0.0050 or less. Through this bending-unbending deformation processing, strain is introduced into the surface layer of a steel sheet to be the base steel sheet, and the outermost layer is transformed into bcc iron efficiently. In the present invention, since the difference in accumulated strain amount between the front and rear surface is made to be 0.0050 or less, bias in bendability between the front and rear surface in the base steel sheet of the finally obtained galvanized steel sheet becomes sufficiently small. On the other hand, when the amount of strain introduced into the surface layer of the steel sheet is biased to one of the front and rear surface and the difference in accumulated strain amount between the front and rear surface exceeds 0.0050, a hardness distribution in the front and rear surface becomes imbalanced, resulting in different bendability in the front and rear surface in the base steel sheet of the finally obtained galvanized steel sheet, which is not preferable. The difference in accumulated strain amount between the front and rear surface of the steel sheet is smaller the better, preferably 0.0030 or less.

Further, although there is no particular upper limit of the number of times of bending-unbending deformation processing, the shape of the steel sheet cannot be maintained when the accumulated strain amount between the front and rear surface of the steel sheet exceeds 0.100, and thus the accumulated strain amount between the front and rear surface is preferably in the range of 0.100 or less.

The roll used for the bending-unbending deformation processing has a radius of 800 mm or less. By having the radius of the roll of 800 mm or less, strain can be introduced easily into the surface layer of the steel sheet. When the radius of the roll is larger than 800 mm, strain cannot be introduced sufficiently into the surface of the steel sheet, the surface layer is not transformed into bcc iron, and thus hardness of the surface layer does not become sufficiently low.

In the bending-unbending deformation processing, bending is performed plural times in which the amount of strain provided by one time of bending on an outside of bending is limited in the range of 0.0007 or more to 0.091 or less by tensile strain. To allow sufficient phase transformation, the amount of strain provided by one time of bending is preferably 0.0010 or more on the outside of bending. When the amount of strain provided on the outside of bending by one time of bending exceeds 0.091, the shape of the steel sheet cannot be maintained. In view of this, the amount of strain provided on the outside of bending by one time of bending is preferably 0.050 or less, more preferably 0.025 or less.

Further, while ferrite transformation in the surface layer of the steel sheet proceeds by the bending-unbending deformation processing in the vicinity of the highest temperature of annealing, in the inside of the steel sheet where strain is small, ferrite transformation is delayed and the ratio of austenite increases, and there occurs a difference in hardness between the surface layer and the inside (¼ thickness). To make an effective difference in hardness occur between the surface layer and the inside (¼ thickness), the sheet thickness of the steel sheet is desirably 0.6 mm or more and 5.0 mm or less. When it is less than 0.6 mm, it is difficult to maintain the shape of the steel sheet. When it is more than 5.0 mm, it is difficult to control temperature of the steel sheet, and target characteristics cannot be obtained. Further, when the roll diameter is more than 800 mm, sufficient strain cannot be introduced into the surface layer of the steel sheet. Although the lower limit of the roll diameter is not particularly set, 50 mm or more is preferable because maintenance costs of equipment increase when a roll less than 50 mm is used.

Next, the steel sheet after the bending-unbending deformation processing is performed is cooled at the average cooling rate of 1.0 to 5.0° C./second in the temperature range of 740° C. to 650° C. Thus, ferrite which is bcc iron is generated in the microstructure in the center portion of the steel sheet, and accompanying this, part of C is diffused from the steel sheet center portion to the surface layer portion. Thus, a concentration difference in C amount between the center portion and the surface layer of the steel sheet becomes small, and the distribution of C amount in the steel sheet corresponds to the range of the ratio between Vickers hardness of surface layer and Vickers hardness of ¼ thickness "(Vickers hardness of surface layer)/(Vickers hardness of ¼ thickness)" in the base steel sheet of the high-strength galvanized steel sheet of the present invention.

When the average cooling rate in the temperature range of 740° C. to 650° C. is less than 1.0° C./second, the retention time in the temperature range of 740° C. to 650° C. becomes long and a large amount of ferrite is generated. Thus, diffusion of C from the center portion of the steel sheet to the surface layer portion is facilitated, and the difference between hardness of the center portion and hardness of the surface layer of the steel sheet becomes insufficient. Further, when the average cooling rate in the temperature range of 740° C. to 650° C. exceeds 5.0° C./second, the amount of ferrite generated in the microstructure of the center portion of the steel sheet is insufficient, and the concentration difference of the C amount between the center portion and the surface layer of the steel sheet is too large.

Note that when the steel sheet is cooled at the average cooling rate of 1.0 to 5.0° C./second in the temperature range of 740° C. to 650° C. after the bending-unbending deformation processing is performed, preferably, it is in an atmosphere in which log(water partial pressure/hydrogen partial pressure) is −3.0 or less. Thus, diffusion of C from the surface layer portion of the steel sheet to the outside in the temperature range of 740° C. to 650° C. can be stopped, C in the surface layer portion can be increased more efficiently, and strength of the base steel sheet of the high-strength galvanized steel sheet can be ensured.

Next, in this embodiment, in the temperature range of 650° C. to 500° C., the steel sheet can be cooled at an average cooling rate of 5 to 200° C./second. By the steel sheet being cooled to a temperature range of 500° C. or less, growth of ferrite in the microstructure of the center portion of the steel sheet is stopped, and diffusion of C across a long distance between the center portion and the surface layer portion of the steel sheet is stopped.

When the average cooling rate in the temperature range of 650° C. to 500° C. is less than 5° C./second, a large amount of perlite and/or iron-based carbide is generated, and thus the retained austenite becomes insufficient. In view of this, the average cooling rate is preferably 7.0° C./second or more, more preferably 8.0° C./second or more. On the other hand, although effects of the present invention are exhibited without particularly setting the upper limit of the average cooling rate in the temperature range of 650° C. to 500° C., special equipment is needed for making the average cooling rate exceed 200° C., and thus the upper limit of the cooling rate is set to 200° C./second in view of costs.

Next, in this embodiment, the steel sheet is preferably retained for 15 to 1000 seconds in the temperature range of 500° C. to 400° C. Thus, the steel sheet to be the base steel sheet obtains preferable amounts of retained austenite, bainite, and/or bainitic ferrite. At 400° C. or less, bainite transformation proceeds excessively, C concentration to retained austenite proceeds, and thus a large amount of retained austenite remains. Thus, it becomes difficult to make the volume fraction of retained austenite to be 8% or less. Further, when the retention time in the temperature range of 500° C. to 400° C. exceeds 1000 seconds, coarse iron-based carbide, which works as a starting point of destruction, is generated and grows, and thus bendability deteriorates largely.

(Plating Alloying Step)

Next, an alloying treatment is performed, including dipping the steel sheet after the continuous annealing step in a galvanizing bath, and then retaining at a temperature of 470 to 650° C. for 10 to 120 seconds. Thus, the high-strength galvanized steel sheet of the present invention is formed, which contains Zn—Fe alloy in the surface of the base steel sheet and in which an alloyed galvanized layer with an iron content of 8 to 12% is formed.

Note that normally, the larger the carbon content of the base steel sheet, the lower the content of iron contained in the alloyed galvanized layer and the lower the adhesion between the base steel sheet and the alloyed galvanized layer. Further, in the present invention, in order to make a high-strength galvanized steel sheet with maximum tensile strength of 900 MPa or more, a large amount of carbon which is an element that improves strength is contained. However, in the present invention, since the carbon concentration in the surface layer of the cold-rolled steel sheet to be the base steel sheet obtained after the continuous annealing step is low, the alloyed galvanized layer excellent in adhesion with an iron content of 8 to 12% is formed in the plating alloying step.

The galvanizing bath is not particularly limited, effects of the present invention are not impaired when one or more of Pb, Sb, Si, Sn, Mg, Mn, Ni, Cr, Co, Ca, Cu, Li, Ti, Be, Bi, Sr, I, Cs, REM is mixed in the galvanizing bath, and there may even be cases where they improve corrosion resistance, workability, and/or the like depending on their contents, and hence are preferable. Further, Al may be contained in the galvanizing bath. In this case, the Al concentration in the bath is preferably 0.05% or more and 0.15% or less.

Further, the temperature of the alloying treatment is preferably 480 to 560° C., and the retention time of the alloying treatment is preferably 15 to 60 seconds.

In this embodiment, after the alloying treatment, retaining at a temperature of 200 to 350° C. for 30 to 1000 seconds is preferable. This makes the base steel sheet structure of the high-strength galvanized steel sheet contain tempered martensite. As a result, the base steel sheet structure of the high-strength galvanized steel sheet has retained austenite, ferrite, bainite and/or bainitic ferrite, and tempered martensite, and by having such base steel sheet structure, it becomes a steel sheet in which the above-described kurtosis K* of hardness distribution is −0.30 or less.

Note that instead of retaining at a temperature of 200 to 350° C. for 30 to 1000 seconds after the alloying treatment, the steel sheet after the alloying treatment may be cooled to 350° C. or less to generate martensite, and thereafter, it may be reheated to the temperature range of 350° or more and 550° C. or less and retained for two seconds or more to generate tempered martensite. Further, tempered martensite is generated in the base steel sheet structure also by further cooling the steel sheet, which has been cooled to the temperature region of 500° C. or less in the continuous annealing step, to 350° C. or less to generate martensite and then reheating it, and retaining at 400 to 500° C.

Moreover, in this embodiment, it is also possible to perform cold rolling with a reduction ratio of 0.05 to 3.00% for shape correction on the high-strength galvanized steel sheet cooled to room temperature.

Note that the present invention is not limited to the above-described examples.

For example, in the present invention, it is also possible to add a coating film constituted of a P oxide and/or a composite oxide containing P on the surface of the alloyed galvanized layer of the galvanized steel sheet obtained by the above-described method.

A coating film constituted of a phosphorus oxide and/or a composite oxide containing phosphorous can function as a lubricant when a steel sheet is processed, and can protect the alloyed galvanized layer formed on the surface of the base steel sheet.

EXAMPLES

The present invention will be described in further detail using examples.

Slabs having chemical components (composition) of A to Z, AA to AC illustrated in Table 1 and Table 2, and BA to BF illustrated in Table 3 were cast, hot rolled under the conditions (slab heating temperature, finish hot-rolling temperature) illustrated in Table 4 to Table 7 just after casting, cooled, coiled at temperatures illustrated in Table 4 to Table 7, and subjected to pickling. Experimental examples 4, 10, 16, 22, 49, 54, 102, 106 were just hot rolled (no cold rolling), and other experimental examples were cold rolled under the conditions (reduction ratios) illustrated in Table 3 to Table 5. Then, a continuous annealing step and a plating alloying step were performed under the conditions illustrated in Table 8 to Table 11 on respective steel sheets of experimental examples 1 to 109, 201 to 218.

TABLE 1

| CHEMICAL COMPONENT | C MASS % | Si MASS % | Mn MASS % | P MASS % | S MASS % | Al MASS % | N MASS % | O MASS % |
|---|---|---|---|---|---|---|---|---|
| A | 0.120 | 0.52 | 2.52 | 0.006 | 0.0031 | 0.026 | 0.0029 | 0.0006 |
| B | 0.088 | 1.08 | 2.57 | 0.006 | 0.0017 | 0.021 | 0.0025 | 0.0010 |
| C | 0.192 | 0.88 | 2.97 | 0.011 | 0.0048 | 0.032 | 0.0022 | 0.0004 |
| D | 0.118 | 1.58 | 1.94 | 0.006 | 0.0032 | 0.009 | 0.0046 | 0.0004 |
| E | 0.210 | 0.55 | 2.34 | 0.016 | 0.0020 | 0.031 | 0.0042 | 0.0012 |
| F | 0.149 | 0.60 | 1.98 | 0.021 | 0.0003 | 0.016 | 0.0049 | 0.0006 |
| G | 0.132 | 1.96 | 1.78 | 0.008 | 0.0015 | 0.037 | 0.0041 | 0.0011 |
| H | 0.230 | 1.16 | 1.61 | 0.014 | 0.0032 | 0.034 | 0.0029 | 0.0025 |
| I | 0.188 | 0.68 | 2.17 | 0.009 | 0.0007 | 0.050 | 0.0045 | 0.0009 |
| J | 0.176 | 1.78 | 1.43 | 0.005 | 0.0034 | 0.021 | 0.0060 | 0.0006 |
| K | 0.098 | 0.65 | 2.75 | 0.012 | 0.0035 | 0.100 | 0.0036 | 0.0015 |
| L | 0.146 | 0.44 | 1.79 | 0.013 | 0.0051 | 0.330 | 0.0028 | 0.0007 |
| M | 0.200 | 1.53 | 2.25 | 0.010 | 0.0011 | 0.022 | 0.0012 | 0.0002 |
| N | 0.135 | 2.21 | 1.38 | 0.006 | 0.0042 | 0.023 | 0.0023 | 0.0008 |
| O | 0.173 | 1.25 | 1.98 | 0.005 | 0.0036 | 0.039 | 0.0036 | 0.0041 |
| P | 0.230 | 0.97 | 1.51 | 0.014 | 0.0031 | 0.041 | 0.0029 | 0.0015 |
| Q | 0.268 | 0.78 | 1.60 | 0.012 | 0.0007 | 0.011 | 0.0048 | 0.0002 |
| R | 0.113 | 1.65 | 1.72 | 0.014 | 0.0014 | 0.032 | 0.0045 | 0.0034 |
| S | 0.157 | 0.90 | 2.33 | 0.015 | 0.0017 | 0.040 | 0.0020 | 0.0011 |
| T | 0.156 | 1.19 | 2.67 | 0.005 | 0.0032 | 0.048 | 0.0011 | 0.0004 |
| U | 0.137 | 0.86 | 2.75 | 0.004 | 0.0021 | 0.627 | 0.0008 | 0.0012 |
| V | 0.196 | 2.06 | 1.55 | 0.006 | 0.0052 | 0.048 | 0.0043 | 0.0003 |
| W | 0.165 | 0.71 | 2.13 | 0.011 | 0.0020 | 0.050 | 0.0026 | 0.0010 |
| X | 0.117 | 0.39 | 1.96 | 0.015 | 0.0009 | 1.057 | 0.0039 | 0.0026 |
| Y | 0.081 | 1.47 | 2.44 | 0.015 | 0.0047 | 0.048 | 0.0022 | 0.0012 |
| Z | 0.138 | 1.11 | 3.14 | 0.006 | 0.0050 | 0.021 | 0.0012 | 0.0007 |
| AA | <u>0.005</u> | 0.99 | 2.00 | 0.007 | 0.0028 | 0.036 | 0.0028 | 0.0016 |
| AB | 0.199 | <u>0.02</u> | 2.00 | 0.014 | 0.0038 | 0.042 | 0.0040 | 0.0008 |
| AC | 0.199 | 1.00 | <u>0.55</u> | 0.013 | 0.0034 | 0.027 | 0.0029 | 0.0011 |

TABLE 2

| CHEMICAL COMPONENT | Ti MASS % | Nb MASS % | B MASS % | Cr MASS % | Ni MASS % | Cu MASS % | Mc MASS % | V MASS % | Ca MASS % |
|---|---|---|---|---|---|---|---|---|---|
| A | | | | | | | | | |
| B | | | | | | | | | |
| C | | | | | | | | | |
| D | | | | | | | | | |
| E | | 0.010 | | | | | | | |
| F | | | 0.0010 | | | | | | |
| G | | | | 0.17 | | | | | |
| H | | | | | 0.44 | | | | |
| I | 0.117 | 0.005 | | | | | | | |
| J | | | | | | 0.35 | | | |
| K | 0.007 | | | 0.15 | 0.21 | 0.25 | | | |
| L | 0.035 | | 0.0023 | | | | | | |
| M | | | | | | | 0.07 | | |
| N | | | | | 0.59 | 0.51 | 0.25 | | |
| O | | | | | | | | | 0.146 |
| P | 0.048 | | | | | | | | |
| Q | | 0.035 | | | | | | | |
| R | | | | | | | | | |
| S | 0.066 | | | 0.41 | | | | | |
| T | | | | | | | | | 0.0024 |
| U | | | | | | | | | |
| V | | | 0.0035 | | | | | 0.12 | 0.0033 |
| W | | 0.055 | | | | | | | 0.0015 |
| X | | | | | | | | | |
| Y | | | | | | | | | |
| Z | | | | | | | | | |
| AA | | | | | | | | | |
| AB | | | | | | | | | |
| AC | | | | | | | | | |

| CHEMICAL COMPONENT | Ce MASS % | Mg MASS % | Zr MASS % | Hf MASS % | REM MASS % | |
|---|---|---|---|---|---|---|
| A | | | | | | EXAMPLE |
| B | | | | | | EXAMPLE |

TABLE 2-continued

| | | | | | |
|---|---|---|---|---|---|
| C | | | | | EXAMPLE |
| D | | | | | EXAMPLE |
| E | | | | | EXAMPLE |
| F | | | | | EXAMPLE |
| G | | | | | EXAMPLE |
| H | | | | | EXAMPLE |
| I | | | | 0.0019 | EXAMPLE |
| J | | | | | EXAMPLE |
| K | | | | | EXAMPLE |
| L | | | | | EXAMPLE |
| M | | | | | EXAMPLE |
| N | | | | | EXAMPLE |
| O | | | | | EXAMPLE |
| P | | | 0.0024 | | EXAMPLE |
| Q | | | | 0.0015 | EXAMPLE |
| R | | | | | EXAMPLE |
| S | | | | | EXAMPLE |
| T | | | | | EXAMPLE |
| U | 0.0015 | | | | EXAMPLE |
| V | | 0.0006 | | | EXAMPLE |
| W | 0.0008 | | | | EXAMPLE |
| X | | 0.0014 | | | EXAMPLE |
| Y | | | | | EXAMPLE |
| Z | | | | | EXAMPLE |
| AA | | | | | COMPARATIVE EXAMPLE |
| AB | | | | | COMPARATIVE EXAMPLE |
| AC | | | | | COMPARATIVE EXAMPLE |

TABLE 3

| EXPERIMENTAL EXAMPLE | C MASS % | Si MASS % | Mn MASS % | P MASS % | S MASS % | Al MASS % | N MASS % | O MASS % | Ti MASS % |
|---|---|---|---|---|---|---|---|---|---|
| BA | 0.168 | 0.39 | 2.09 | 0.802 | 0.0034 | 0.943 | 0.0026 | 0.0005 | |
| BB | 0.215 | 1.58 | 2.56 | 0.210 | 0.0015 | 0.091 | 0.0085 | 0.0012 | |
| BC | 0.174 | 1.54 | 1.73 | 0.013 | 0.0017 | 0.019 | 0.0048 | 0.0009 | |
| BD | 0.090 | 0.78 | 1.92 | 0.010 | 0.0012 | 0.296 | 0.0066 | 0.0016 | 0.064 |
| BE | 0.147 | 1.13 | 2.28 | 0.009 | 0.0020 | 0.079 | 0.0076 | 0.0013 | |
| BF | 0.236 | 0.72 | 1.56 | 0.008 | 0.0022 | 0.037 | 0.0025 | 0.0008 | |

| EXPERIMENTAL EXAMPLE | Nb MASS % | B MASS % | Cr MASS % | Ni MASS % | Cu MASS % | Mo MASS % | V MASS % | Ca MASS % | Ce MASS % |
|---|---|---|---|---|---|---|---|---|---|
| BA | | | | | | | | | |
| BB | | | | | | | | | |
| BC | | | | | | | | | |
| BD | | | | | | | | | |
| BE | | | | | | | | | |
| BF | | | | | | | | | |

| EXPERIMENTAL EXAMPLE | Mg MASS % | Zr MASS % | Hf MASS % | REM MASS % | W MASS % | |
|---|---|---|---|---|---|---|
| BA | | | | | | EXAMPLE |
| BB | | | | | | EXAMPLE |
| BC | | | | | | EXAMPLE |
| BD | | | | | | EXAMPLE |
| BE | | | | 0.0017 | | EXAMPLE |
| BF | | | | | 0.30 | EXAMPLE |

TABLE 4

| EXPERIMENTAL EXAMPLE | CHEMICAL COMPONENT | SLAB HEATING TEMPERATURE °C. | $Ar_3$ TRANSFORMATION POINT °C. | FINISH HOT-ROLLING TEMPERATURE °C. | COILING TEMPERATURE °C. | COLD-ROLLING REDUCTION RATIO % | |
|---|---|---|---|---|---|---|---|
| 1 | A | 1235 | 649 | 914 | 629 | 66 | EXAMPLE |
| 2 | A | 1260 | 649 | 936 | 692 | 51 | EXAMPLE |
| 3 | A | 1255 | 649 | 940 | 576 | 40 | EXAMPLE |
| 4 | A | 1225 | 649 | 951 | 602 | 0 | EXAMPLE |
| 5 | A | 1180 | 649 | 952 | 604 | 72 | EXAMPLE |

TABLE 4-continued

| EXPERIMENTAL EXAMPLE | CHEMICAL COMPONENT | SLAB HEATING TEMPERATURE ° C. | $Ar_3$ TRANSFORMATION POINT ° C. | FINISH HOT-ROLLING TEMPERATURE ° C. | COILING TEMPERATURE ° C. | COLD-ROLLING REDUCTION RATIO % | |
|---|---|---|---|---|---|---|---|
| 6 | A | 1250 | 649 | 902 | 621 | 62 | COMPARATIVE EXAMPLE |
| 7 | B | 1275 | 673 | 909 | 676 | 44 | EXAMPLE |
| 8 | B | 1245 | 673 | 949 | 589 | 57 | EXAMPLE |
| 9 | B | 1250 | 673 | 885 | 587 | 39 | EXAMPLE |
| 10 | B | 1230 | 673 | 918 | 588 | 0 | EXAMPLE |
| 11 | B | 1250 | 673 | 922 | 621 | 76 | COMPARATIVE EXAMPLE |
| 12 | B | 1235 | 673 | 911 | 658 | 65 | COMPARATIVE EXAMPLE |
| 13 | C | 1250 | 596 | 919 | 614 | 44 | EXAMPLE |
| 14 | C | 1240 | 596 | 944 | 581 | 67 | EXAMPLE |
| 15 | C | 1265 | 596 | 952 | 636 | 57 | EXAMPLE |
| 16 | C | 1205 | 596 | 946 | 603 | 0 | EXAMPLE |
| 17 | C | 1185 | 596 | 920 | 626 | 37 | COMPARATIVE EXAMPLE |
| 18 | C | 1235 | 596 | 925 | 679 | 70 | COMPARATIVE EXAMPLE |
| 19 | D | 1245 | 737 | 890 | 638 | 65 | EXAMPLE |
| 20 | D | 1215 | 737 | 948 | 594 | 56 | EXAMPLE |
| 21 | D | 1225 | 737 | 919 | 645 | 60 | EXAMPLE |
| 22 | D | 1200 | 737 | 940 | 550 | 0 | EXAMPLE |
| 23 | D | 1190 | 737 | 931 | 564 | 39 | COMPARATIVE EXAMPLE |
| 24 | D | 1265 | 737 | 948 | 627 | 62 | COMPARATIVE EXAMPLE |
| 25 | E | 1270 | 638 | 912 | 632 | 53 | EXAMPLE |
| 26 | E | 1275 | 638 | 930 | 627 | 60 | EXAMPLE |
| 27 | E | 1225 | 638 | 943 | 602 | 35 | EXAMPLE |
| 28 | E | 1185 | 638 | 905 | 590 | 67 | COMPARATIVE EXAMPLE |
| 29 | E | 1235 | 638 | 916 | 686 | 42 | COMPARATIVE EXAMPLE |
| 30 | F | 1220 | 691 | 920 | 611 | 70 | EXAMPLE |
| 31 | F | 1260 | 691 | 952 | 612 | 57 | EXAMPLE |
| 32 | F | 1180 | 691 | 946 | 636 | 61 | EXAMPLE |
| 33 | F | 1270 | 691 | 922 | 627 | 35 | COMPARATIVE EXAMPLE |
| 34 | F | 1245 | 691 | 920 | 625 | 64 | COMPARATIVE EXAMPLE |
| 35 | G | 1205 | 753 | 944 | 631 | 77 | EXAMPLE |
| 36 | G | 1270 | 753 | 929 | 672 | 41 | EXAMPLE |
| 37 | G | 1235 | 753 | 938 | 591 | 47 | EXAMPLE |
| 38 | G | 1245 | 753 | 942 | 654 | 60 | COMPARATIVE EXAMPLE |
| 39 | G | 1250 | 753 | 936 | 658 | 64 | COMPARATIVE EXAMPLE |

TABLE 5

| EXPERIMENTAL EXAMPLE | CHEMICAL COMPONENT | SLAB HEATING TEMPERATURE ° C. | $Ar_3$ TRANSFORMATION POINT ° C. | FINISH HOT-ROLLING TEMPERATURE ° C. | COILING TEMPERATURE ° C. | COLD-ROLLING REDUCTION RATIO % | |
|---|---|---|---|---|---|---|---|
| 40 | H | 1210 | 698 | 924 | 613 | 44 | EXAMPLE |
| 41 | H | 1240 | 698 | 911 | 624 | 62 | EXAMPLE |
| 42 | H | 1190 | 698 | 937 | 638 | 65 | EXAMPLE |
| 43 | H | 1240 | 698 | 929 | 618 | 55 | COMPARATIVE EXAMPLE |
| 44 | H | 1240 | 698 | 937 | 616 | 67 | COMPARATIVE EXAMPLE |
| 45 | I | 1250 | 666 | 892 | 538 | 67 | EXAMPLE |
| 46 | I | 1200 | 666 | 903 | 622 | 64 | EXAMPLE |
| 47 | I | 1265 | 666 | 921 | 579 | 56 | EXAMPLE |
| 48 | I | 1245 | 666 | 903 | 574 | 70 | EXAMPLE |
| 49 | I | 1240 | 666 | 916 | 597 | 0 | EXAMPLE |
| 50 | J | 1215 | 756 | 885 | 644 | 68 | EXAMPLE |
| 51 | J | 1225 | 756 | 938 | 601 | 58 | EXAMPLE |
| 52 | J | 1185 | 756 | 938 | 609 | 75 | EXAMPLE |
| 53 | J | 1270 | 756 | 923 | 635 | 64 | EXAMPLE |
| 54 | J | 1210 | 756 | 948 | 594 | 0 | EXAMPLE |

TABLE 5-continued

| EXPERI-MENTAL EXAMPLE | CHEMICAL COMPONENT | SLAB HEATING TEMPERATURE ° C. | Ar$_3$ TRANS-FORMATION POINT ° C. | FINISH HOT-ROLLING TEMPERATURE ° C. | COILING TEMPERATURE ° C. | COLD-ROLLING REDUCTION RATIO % | |
|---|---|---|---|---|---|---|---|
| 55 | K | 1265 | 616 | 896 | 521 | 53 | EXAMPLE |
| 56 | K | 1195 | 616 | 904 | 587 | 52 | EXAMPLE |
| 57 | K | 1180 | 616 | 912 | 652 | 67 | EXAMPLE |
| 58 | L | 1275 | 724 | 929 | 675 | 71 | EXAMPLE |
| 59 | L | 1195 | 724 | 950 | 623 | 63 | EXAMPLE |
| 60 | L | 1180 | 724 | 940 | 605 | 72 | EXAMPLE |
| 61 | M | 1235 | 679 | 933 | 687 | 74 | EXAMPLE |
| 62 | M | 1245 | 679 | 927 | 705 | 72 | EXAMPLE |
| 63 | M | 1210 | 679 | 950 | 610 | 46 | EXAMPLE |
| 64 | N | 1235 | 742 | 919 | 505 | 46 | EXAMPLE |
| 65 | N | 1245 | 742 | 937 | 634 | 69 | EXAMPLE |
| 66 | N | 1270 | 742 | 916 | 628 | 54 | EXAMPLE |
| 67 | O | 1245 | 706 | 890 | 652 | 53 | EXAMPLE |
| 68 | O | 1270 | 706 | 940 | 607 | 67 | EXAMPLE |
| 69 | O | 1185 | 706 | 940 | 643 | 68 | EXAMPLE |
| 70 | P | 1215 | 722 | 955 | 597 | 45 | EXAMPLE |
| 71 | P | 1235 | 722 | 910 | 588 | 40 | EXAMPLE |
| 72 | P | 1225 | 722 | 932 | 653 | 57 | EXAMPLE |
| 73 | Q | 1225 | 693 | 884 | 504 | 56 | EXAMPLE |
| 74 | Q | 1185 | 693 | 943 | 638 | 72 | EXAMPLE |
| 75 | Q | 1235 | 693 | 897 | 626 | 67 | EXAMPLE |
| 76 | R | 1215 | 762 | 903 | 595 | 53 | EXAMPLE |
| 77 | R | 1250 | 762 | 902 | 706 | 72 | EXAMPLE |
| 78 | R | 1245 | 762 | 947 | 656 | 55 | EXAMPLE |
| 79 | S | 1215 | 649 | 914 | 615 | 66 | EXAMPLE |

TABLE 6

| EXPERI-MENTAL EXAMPLE | CHEMICAL COMPONENT | SLAB HEATING TEMPERATURE ° C. | Ar$_3$ TRANS-FORMATION POINT ° C. | FINISH HOT-ROLLING TEMPERATURE ° C. | COILING TEMPERATURE ° C. | COLD-ROLLING REDUCTION RATIO % | |
|---|---|---|---|---|---|---|---|
| 80 | S | 1215 | 649 | 931 | 607 | 40 | EXAMPLE |
| 81 | S | 1270 | 649 | 943 | 613 | 72 | EXAMPLE |
| 82 | T | 1265 | 647 | 906 | 694 | 65 | EXAMPLE |
| 83 | T | 1220 | 647 | 925 | 671 | 58 | EXAMPLE |
| 84 | T | 1220 | 647 | 911 | 618 | 51 | EXAMPLE |
| 85 | U | 1250 | 671 | 952 | 633 | 53 | EXAMPLE |
| 86 | U | 1225 | 671 | 936 | 591 | 65 | EXAMPLE |
| 87 | U | 1255 | 671 | 933 | 664 | 53 | EXAMPLE |
| 88 | V | 1270 | 760 | 898 | 598 | 73 | EXAMPLE |
| 89 | V | 1185 | 760 | 935 | 609 | 54 | EXAMPLE |
| 90 | V | 1255 | 760 | 935 | 633 | 42 | EXAMPLE |
| 91 | W | 1180 | 678 | 928 | 591 | 50 | EXAMPLE |
| 92 | W | 1195 | 678 | 935 | 653 | 56 | EXAMPLE |
| 93 | W | 1200 | 678 | 899 | 658 | 65 | EXAMPLE |
| 94 | W | 1180 | 678 | <u>705</u> | 599 | 53 | COMPARATIVE EXAMPLE |
| 95 | X | 1250 | 761 | 933 | 533 | 64 | EXAMPLE |
| 96 | X | 1265 | 761 | 944 | 634 | 57 | EXAMPLE |
| 97 | X | 1185 | 761 | 925 | 599 | 73 | EXAMPLE |
| 98 | X | 1270 | 761 | 922 | <u>810</u> | 51 | COMPARATIVE EXAMPLE |
| 99 | Y | 1185 | 702 | 895 | 660 | 57 | EXAMPLE |
| 100 | Y | 1210 | 702 | 900 | 612 | 53 | EXAMPLE |
| 101 | Y | 1205 | 702 | 912 | 672 | 70 | EXAMPLE |
| 102 | Y | 1195 | 702 | 954 | 579 | 0 | EXAMPLE |
| 103 | Z | 1200 | 605 | 896 | 598 | 53 | EXAMPLE |
| 104 | Z | 1265 | 605 | 935 | 638 | 39 | EXAMPLE |
| 105 | Z | 1215 | 605 | 930 | 617 | 44 | EXAMPLE |
| 106 | Z | 1210 | 605 | 935 | 647 | 0 | EXAMPLE |
| 107 | AA | 1230 | 750 | 929 | 703 | 53 | COMPARATIVE EXAMPLE |
| 108 | AB | 1220 | 656 | 926 | 709 | 53 | COMPARATIVE EXAMPLE |
| 109 | AC | 1230 | 820 | 928 | 690 | 53 | COMPARATIVE EXAMPLE |

TABLE 7

| EXPERI-MENTAL EXAMPLE | CHEMICAL COMPONENT | SLAB HEATING TEMPERATURE °C. | Ar₃ TRANS-FORMATION POINT °C. | HOT-ROLLING COMPLETING TEMPERATURE °C. | COILING TEMPERATURE °C. | COLD REDUCTION RATIO % | SHEET THICKNESS mm | |
|---|---|---|---|---|---|---|---|---|
| 201 | BA | 1235 | 716 | 865 | 641 | 60 | 1.00 | EXAMPLE |
| 202 | BA | 1240 | 716 | 863 | 541 | 75 | 0.75 | EXAMPLE |
| 203 | BA | 1235 | 716 | 896 | 637 | 75 | 0.05 | COMPARATIVE EXAMPLE |
| 204 | BB | 1225 | 663 | 870 | 645 | 60 | 2.50 | EXAMPLE |
| 205 | BB | 1220 | 663 | 876 | 603 | 33 | 3.20 | EXAMPLE |
| 206 | BB | 1225 | 663 | 891 | 608 | 50 | 2.50 | COMPARATIVE EXAMPLE |
| 207 | BC | 1220 | 737 | 879 | 600 | 50 | 2.00 | EXAMPLE |
| 208 | BC | 1225 | 737 | 905 | 618 | 50 | 2.00 | EXAMPLE |
| 209 | BC | 1225 | 737 | 873 | 578 | 67 | 0.80 | COMPARATIVE EXAMPLE |
| 210 | BD | 1220 | 736 | 881 | 664 | 67 | 0.80 | EXAMPLE |
| 211 | BD | 1240 | 736 | 876 | 532 | 67 | 1.00 | EXAMPLE |
| 212 | BD | 1240 | 736 | 887 | 639 | 0 | 8.00 | COMPARATIVE EXAMPLE |
| 213 | BE | 1235 | 685 | 871 | 574 | 0 | 3.50 | EXAMPLE |
| 214 | BE | 1230 | 685 | 888 | 530 | 67 | 0.87 | EXAMPLE |
| 215 | BE | 1225 | 685 | 915 | 545 | 0 | 10.0 | COMPARATIVE EXAMPLE |
| 216 | BF | 1230 | 706 | 896 | 655 | 75 | 0.70 | EXAMPLE |
| 217 | BF | 1235 | 706 | 892 | 621 | 67 | 1.33 | EXAMPLE |
| 218 | BF | 1230 | 706 | 904 | 644 | 67 | 0.75 | COMPARATIVE EXAMPLE |

TABLE 8

| EXPERI-MENTAL EXAMPLE | CHEMICAL COMPONENT | Ac₁ °C. | Ac₃ °C. | CONTINUOUS ANNEALING STEP ||||||| 
|---|---|---|---|---|---|---|---|---|---|
| | | | | AVERAGE HEATING RATE °C./SECOND | MAXIMUM HEATING TEMPERATURE °C. | REDUCTION TIME SECOND | log (PH₂O/PH₂) | Δε | AVERAGE COOLING RATE OF 740° C. TO 680° C. °C./SECOND | AVERAGE COOLING RATE OF 650° C. TO 500° C. °C./SECOND |
| 1 | A | 701 | 813 | 2.3 | 781 | 48 | -2.3 | 0.0000 | 3.2 | 11 |
| 2 | A | 701 | 813 | 3.3 | 784 | 108 | -0.9 | 0.0000 | 2.0 | 9 |
| 3 | A | 701 | 813 | 2.6 | 770 | 30 | -2.2 | 0.0000 | 2.0 | 12 |
| 4 | A | 701 | 813 | 4.2 | 778 | 43 | -1.0 | 0.0000 | 3.1 | 10 |
| 5 | A | 701 | 813 | 3.2 | 785 | 86 | -1.5 | 0.0000 | 3.1 | 2 |
| 6 | A | 701 | 813 | 0.1 | 794 | 84 | -1.0 | 0.0000 | 2.6 | 13 |
| 7 | B | 719 | 836 | 2.5 | 814 | 65 | -1.0 | 0.0000 | 2.6 | 73 |
| 8 | B | 719 | 836 | 4.0 | 806 | 69 | -1.4 | 0.0000 | 2.9 | 88 |
| 9 | B | 719 | 836 | 4.3 | 810 | 66 | -1.4 | 0.0000 | 3.0 | 78 |
| 10 | B | 719 | 836 | 3.7 | 824 | 115 | -2.0 | 0.0000 | 3.3 | 81 |
| 11 | B | 719 | 836 | 4.5 | 650 | 110 | -1.9 | 0.0000 | 3.4 | 75 |
| 12 | B | 719 | 836 | 4.2 | 1100 | 106 | -0.8 | 0.0000 | 3.4 | 84 |
| 13 | C | 707 | 797 | 2.2 | 779 | 65 | -0.8 | 0.0000 | 3.4 | 83 |
| 14 | C | 707 | 797 | 3.3 | 777 | 111 | -1.0 | 0.0023 | 3.0 | 77 |
| 15 | C | 707 | 797 | 3.0 | 792 | 98 | -1.8 | 0.0023 | 3.0 | 67 |
| 16 | C | 707 | 797 | 2.8 | 772 | 64 | -0.9 | 0.0000 | 3.4 | 87 |
| 17 | C | 707 | 797 | 3.1 | 784 | 10 | -1.2 | 0.0000 | 3.1 | 74 |
| 18 | C | 707 | 797 | 3.9 | 776 | 1000 | -2.2 | 0.0000 | 1.8 | 86 |
| 19 | D | 733 | 874 | 3.7 | 825 | 56 | -0.8 | 0.0000 | 2.6 | 10 |
| 20 | D | 733 | 874 | 3.1 | 849 | 70 | -1.5 | 0.0000 | 3.3 | 9 |
| 21 | D | 733 | 874 | 3.1 | 841 | 84 | -0.8 | 0.0000 | 3.1 | 8 |
| 22 | D | 733 | 874 | 3.1 | 859 | 31 | -1.4 | 0.0000 | 1.8 | 8 |
| 23 | D | 733 | 874 | 2.6 | 814 | 111 | -4.5 | 0.0000 | 1.9 | 8 |
| 24 | D | 733 | 874 | 4.3 | 831 | 56 | 1.5 | 0.0000 | 3.1 | 11 |
| 25 | E | 711 | 787 | 3.0 | 783 | 53 | -1.1 | 0.0000 | 2.7 | 36 |
| 26 | E | 711 | 787 | 2.7 | 782 | 91 | -0.8 | 0.0000 | 2.5 | 33 |
| 27 | E | 711 | 787 | 3.5 | 760 | 47 | -1.4 | 0.0000 | 3.1 | 34 |
| 28 | E | 711 | 787 | 3.6 | 777 | 82 | -1.2 | 0.0000 | 2.4 | 35 |
| 29 | E | 711 | 787 | 2.5 | 783 | 33 | -2.2 | 0.0000 | 2.1 | 35 |
| 30 | F | 715 | 814 | 4.1 | 798 | 107 | -2.3 | 0.0125 | 3.3 | 14 |
| 31 | F | 715 | 814 | 2.5 | 798 | 62 | -2.2 | 0.0099 | 3.1 | 13 |
| 32 | F | 715 | 814 | 3.5 | 798 | 109 | -0.7 | 0.0000 | 2.7 | 15 |
| 33 | F | 715 | 814 | 3.6 | 795 | 48 | -0.7 | 0.0000 | 0.1 | 8 |
| 34 | F | 715 | 814 | 3.5 | 809 | 107 | -1.8 | 0.0000 | 20.0 | 7 |
| 35 | G | 753 | 886 | 4.1 | 800 | 113 | -2.2 | 0.0000 | 3.4 | 36 |
| 36 | G | 753 | 886 | 3.6 | 863 | 81 | -0.8 | 0.0000 | 2.8 | 34 |
| 37 | G | 753 | 886 | 4.5 | 872 | 83 | -1.9 | 0.0000 | 3.4 | 33 |

TABLE 8-continued

| | | | | | | | | | | |
|---|---|---|---|---|---|---|---|---|---|---|
| 38 | G | 753 | 886 | 3.1 | 838 | 109 | -1.0 | 0.0000 | 3.1 | 34 |
| 39 | G | 753 | 886 | 3.2 | 837 | 68 | -0.8 | 0.0000 | 2.4 | 33 |

| EXPERI-MENTAL EXAMPLE | RETENTION TIME SECOND | ALLOYING TREATMENT | | | |
|---|---|---|---|---|---|
| | | AVERAGE TEMPERATURE °C | TREATMENT TIME SECOND | RETENTION TIME SECOND | |
| 1 | 22 | 510 | 48 | 48 | EXAMPLE |
| 2 | 24 | 478 | 25 | 43 | EXAMPLE |
| 3 | 22 | 514 | 31 | 46 | EXAMPLE |
| 4 | 24 | 492 | 44 | 49 | EXAMPLE |
| 5 | 19 | 483 | 40 | 51 | COMPARATIVE EXAMPLE |
| 6 | 68 | 516 | 46 | 67 | COMPARATIVE EXAMPLE |
| 7 | 75 | 487 | 40 | 47 | EXAMPLE |
| 8 | 63 | 475 | 37 | 64 | EXAMPLE |
| 9 | 65 | 511 | 25 | 44 | EXAMPLE |
| 10 | 76 | 530 | 36 | 51 | EXAMPLE |
| 11 | 61 | 492 | 47 | 60 | COMPARATIVE EXAMPLE |
| 12 | 61 | 525 | 29 | 82 | COMPARATIVE EXAMPLE |
| 13 | 59 | 545 | 45 | 293 | EXAMPLE |
| 14 | 72 | 539 | 40 | 341 | EXAMPLE |
| 15 | 79 | 531 | 27 | 330 | EXAMPLE |
| 16 | 62 | 545 | 42 | 234 | EXAMPLE |
| 17 | 74 | 511 | 46 | 360 | COMPARATIVE EXAMPLE |
| 18 | 56 | 525 | 44 | 271 | COMPARATIVE EXAMPLE |
| 19 | 77 | 514 | 40 | 236 | EXAMPLE |
| 20 | 64 | 530 | 30 | 288 | EXAMPLE |
| 21 | 55 | 538 | 51 | 378 | EXAMPLE |
| 22 | 77 | 520 | 33 | 311 | EXAMPLE |
| 23 | 60 | 543 | 42 | 255 | COMPARATIVE EXAMPLE |
| 24 | 71 | 538 | 48 | 314 | COMPARATIVE EXAMPLE |
| 25 | 55 | 528 | 50 | 310 | EXAMPLE |
| 26 | 79 | 555 | 44 | 362 | EXAMPLE |
| 27 | 80 | 544 | 26 | 255 | EXAMPLE |
| 28 | 68 | 511 | 26 | 69 | COMPARATIVE EXAMPLE |
| 29 | 80 | 519 | 31 | 46 | COMPARATIVE EXAMPLE |
| 30 | 187 | 510 | 28 | 70 | EXAMPLE |
| 31 | 192 | 549 | 26 | 67 | EXAMPLE |

TABLE 8-continued

| | | | | | |
|---|---|---|---|---|---|
| 32 | 221 | 544 | 36 | 51 | EXAMPLE |
| 33 | 165 | 531 | 31 | 80 | COMPARATIVE EXAMPLE |
| 34 | 144 | 550 | 40 | 43 | COMPARATIVE EXAMPLE |
| 35 | 194 | 532 | 48 | 74 | EXAMPLE |
| 36 | 139 | 539 | 33 | 43 | EXAMPLE |
| 37 | 222 | 548 | 27 | 66 | EXAMPLE |
| 38 | 181 | <u>653</u> | 36 | 46 | COMPARATIVE EXAMPLE |
| 39 | 190 | <u>461</u> | 30 | 80 | COMPARATIVE EXAMPLE |

TABLE 9

| EXPERI-MENTAL EXAMPLE | CHEMICAL COMPONENT | Ac₁ | Ac₃ °C. | CONTINUOUS ANNEALING STEP | | | | | | | | ALLOYING TREATMENT | | | |
|---|---|---|---|---|---|---|---|---|---|---|---|---|---|---|---|
| | | | | AVERAGE HEATING RATE °C./SECOND | MAXIMUM HEATING TEMPERATURE °C. | RETENTION TIME SECOND | Log(PH₂O/PH₂) | Δε | AVERAGE COOLING RATE OF 740°C. TO 650°C. °C./SECOND | AVERAGE COOLING RATE OF 650°C. TO 500°C. °C./SECOND | RETENTION TIME SECOND | ALLOYING TEMPERATURE °C. | TREATMENT TIME SECOND | RETENTION TIME SECOND | |
| 40 | H | 721 | 826 | 4.3 | 787 | 29 | −1.7 | 0.0000 | 2.6 | 9 | 52 | 546 | 44 | 76 | EXAMPLE |
| 41 | H | 721 | 826 | 3.6 | 803 | 92 | −2.1 | 0.0000 | 3.2 | 6 | 33 | 527 | 28 | 74 | EXAMPLE |
| 42 | H | 721 | 826 | 4.5 | 800 | 78 | −1.5 | 0.0000 | 3.1 | 7 | 31 | 551 | 38 | 68 | EXAMPLE |
| 43 | H | 721 | 826 | 3.9 | 790 | 76 | −1.4 | 0.0000 | 2.4 | 7 | 56 | 542 | 2 | 80 | COMPARATIVE EXAMPLE |
| 44 | H | 721 | 826 | 2.6 | 791 | 110 | −1.8 | 0.0000 | 3.0 | 6 | 49 | 494 | 300 | 51 | COMPARATIVE EXAMPLE |
| 45 | I | 715 | 814 | 3.7 | 799 | 50 | −1.8 | 0.0025 | 2.1 | 13 | 47 | 521 | 37 | 83 | EXAMPLE |
| 46 | I | 715 | 814 | 4.2 | 786 | 57 | −1.3 | 0.0025 | 3.4 | 33 | 25 | 504 | 43 | 55 | EXAMPLE |
| 47 | I | 715 | 814 | 3.2 | 808 | 56 | −1.4 | 0.0000 | 3.3 | 50 | 34 | 543 | 50 | 70 | EXAMPLE |
| 48 | I | 715 | 814 | 3.4 | 798 | 33 | −2.7 | 0.0038 | 4.2 | 50 | 55 | 492 | 29 | 110 | EXAMPLE |
| 49 | I | 715 | 814 | 4.1 | 792 | 68 | −0.3 | 0.0038 | 4.3 | 115 | 30 | 526 | 49 | 95 | EXAMPLE |
| 50 | J | 736 | 877 | 5.6 | 836 | 75 | −2.2 | 0.0007 | 2.1 | 24 | 40 | 546 | 27 | 103 | EXAMPLE |
| 51 | J | 736 | 877 | 3.2 | 827 | 68 | −0.3 | 0.0007 | 2.1 | 29 | 41 | 545 | 36 | 100 | EXAMPLE |
| 52 | J | 736 | 877 | 3.5 | 789 | 96 | −2.0 | 0.0007 | 3.3 | 22 | 34 | 503 | 48 | 68 | EXAMPLE |
| 53 | J | 736 | 877 | 4.1 | 780 | 72 | −2.5 | 0.0007 | 1.3 | 55 | 28 | 534 | 29 | 73 | EXAMPLE |
| 54 | J | 736 | 877 | 2.9 | 785 | 55 | −0.7 | 0.0007 | 3.0 | 132 | 55 | 543 | 31 | 49 | EXAMPLE |
| 55 | K | 703 | 830 | 2.3 | 796 | 51 | −2.1 | 0.0000 | 1.3 | 5 | 52 | 527 | 45 | 66 | EXAMPLE |
| 56 | K | 703 | 830 | 4.0 | 801 | 50 | −2.2 | 0.0000 | 1.9 | 6 | 45 | 544 | 27 | 42 | EXAMPLE |
| 57 | K | 703 | 830 | 3.0 | 813 | 42 | −1.7 | 0.0000 | 2.8 | 6 | 42 | 504 | 50 | 52 | EXAMPLE |
| 58 | L | 720 | 876 | 3.9 | 843 | 66 | −1.0 | 0.0000 | 1.8 | 66 | 47 | 494 | 43 | 80 | EXAMPLE |
| 59 | L | 720 | 876 | 3.7 | 809 | 73 | −1.6 | 0.0000 | 3.1 | 62 | 54 | 537 | 31 | 83 | EXAMPLE |
| 60 | L | 720 | 876 | 4.3 | 861 | 70 | −1.2 | 0.0000 | 2.3 | 63 | 39 | 531 | 50 | 37 | EXAMPLE |
| 61 | L | 720 | 876 | 4.5 | 828 | 91 | −1.3 | 0.0000 | 3.2 | 63 | 45 | 568 | 42 | 83 | EXAMPLE |
| 62 | N | 729 | 845 | 3.2 | 799 | 112 | −0.8 | 0.0000 | 3.3 | 68 | 32 | 553 | 39 | 69 | EXAMPLE |
| 63 | N | 729 | 845 | 4.1 | 822 | 92 | −2.0 | 0.0000 | 3.4 | 65 | 47 | 516 | 31 | 44 | EXAMPLE |
| 64 | N | 729 | 845 | 3.5 | 838 | 95 | −1.5 | 0.0000 | 3.2 | 6 | 43 | 651 | 22 | 606 | EXAMPLE |
| 65 | N | 740 | 896 | 2.4 | 823 | 103 | −2.3 | 0.0000 | 2.8 | 6 | 45 | 610 | 15 | 54 | EXAMPLE |
| 66 | N | 740 | 896 | 4.0 | 873 | 81 | −1.4 | 0.0000 | 2.9 | 14 | 49 | 533 | 20 | 65 | EXAMPLE |
| 67 | O | 726 | 844 | 3.4 | 811 | 24 | −1.1 | 0.0000 | 2.2 | 13 | 49 | 542 | 42 | 55 | EXAMPLE |
| 68 | O | 726 | 844 | 4.5 | 807 | 44 | −1.3 | 0.0000 | 2.2 | 13 | 34 | 524 | 44 | 80 | EXAMPLE |
| 69 | O | 726 | 844 | 3.0 | 801 | 47 | −1.0 | 0.0000 | 2.5 | 19 | 52 | 490 | 66 | 53 | EXAMPLE |
| 70 | P | 727 | 825 | 3.4 | 799 | 81 | −0.7 | 0.0022 | 2.2 | 41 | 29 | 508 | 31 | 74 | EXAMPLE |
| 71 | P | 727 | 825 | 3.7 | 814 | 67 | −1.9 | 0.0022 | 1.8 | 27 | 28 | 503 | 36 | 61 | EXAMPLE |
| 72 | P | 727 | 825 | 3.1 | 807 | 34 | −2.0 | 0.0022 | 2.5 | 28 | 38 | 504 | 33 | 49 | EXAMPLE |
| 73 | Q | 720 | 802 | 3.6 | 797 | 107 | −1.3 | 0.0000 | 2.2 | 68 | 54 | 539 | 43 | 74 | EXAMPLE |
| 74 | Q | 720 | 802 | 2.7 | 786 | 58 | −2.2 | 0.0000 | 1.9 | 69 | 39 | 489 | 79 | 55 | EXAMPLE |
| 75 | Q | 720 | 802 | 3.6 | 789 | 78 | −1.5 | 0.0000 | 4.7 | 65 | 56 | 518 | 39 | 65 | EXAMPLE |

TABLE 9-continued

| EXPERI-MENTAL EXAMPLE | CHEMICAL COMPONENT | Ac₁ °C. | Ac₃ °C. | CONTINUOUS ANNEALING STEP ||||||||| ALLOYING TREATMENT |||
|---|---|---|---|---|---|---|---|---|---|---|---|---|---|---|
| | | | | AVERAGE HEATING RATE °C./SECOND | MAXIMUM HEATING TEMPERATURE °C. | RETENTION TIME SECOND | Log (PH₂O/PH₂) | Δε | AVERAGE COOLING RATE OF 740° C. TO 650° C. °C./SECOND | AVERAGE COOLING RATE OF 650° C. TO 500° C. °C./SECOND | RETENTION TIME SECOND | ALLOYING TEMPERATURE °C. | TREATMENT TIME SECOND | RETENTION TIME SECOND | |
| 76 | R | 741 | 883 | 5.3 | 819 | 29 | −2.0 | 0.0026 | 2.3 | 42 | 158 | 545 | 52 | 349 | EXAMPLE |
| 77 | R | 741 | 883 | 3.3 | 847 | 113 | −1.1 | 0.0026 | 2.3 | 37 | 128 | 513 | 46 | 346 | EXAMPLE |
| 78 | R | 741 | 883 | 4.3 | 864 | 69 | −1.5 | 0.0026 | 2.7 | 33 | 568 | 495 | 36 | 342 | EXAMPLE |
| 79 | S | 731 | 820 | 4.2 | 800 | 64 | −1.6 | 0.0000 | 1.8 | 66 | 180 | 533 | 45 | 61 | EXAMPLE |

TABLE 10

| EXPERI-MENTAL EXAMPLE | CHEMICAL COMPONENT | $Ac_1$ °C. | $Ac_3$ °C. | CONTINUOUS ANNEALING STEP | | | | | | | ALLOYING TREATMENT | | | |
|---|---|---|---|---|---|---|---|---|---|---|---|---|---|---|
| | | | | AVERAGE HEATING RATE °C./SECOND | MAXIMUM HEATING TEMPERATURE °C. | RETENTION TIME SECOND | log(PH$_2$O/PH$_2$) | Δε | AVERAGE COOLING RATE OF 740°C. TO 650°C. °C./SECOND | AVERAGE COOLING RATE OF 650°C. TO 500°C. °C./SECOND | RETENTION TIME SECOND | ALLOYING TEMPERATURE °C. | TREATMENT TIME SECOND | RETENTION TIME SECOND | |
| 80 | S | 731 | 820 | 2.8 | 808 | 94 | −2.1 | 0.0000 | 1.8 | 56 | 160 | 530 | 40 | 64 | EXAMPLE |
| 81 | S | 731 | 820 | 4.5 | 808 | 51 | −2.1 | 0.0000 | 1.8 | 52 | 162 | 544 | 47 | 74 | EXAMPLE |
| 82 | T | 718 | 830 | 3.4 | 802 | 58 | −1.1 | 0.0000 | 1.2 | 84 | 164 | 505 | 43 | 79 | EXAMPLE |
| 83 | T | 718 | 830 | 4.0 | 798 | 30 | −2.3 | 0.0000 | 1.2 | 51 | 115 | 499 | 106 | 63 | EXAMPLE |
| 84 | T | 718 | 830 | 2.7 | 805 | 43 | −1.7 | 0.0000 | 2.2 | 46 | 133 | 542 | 42 | 89 | EXAMPLE |
| 85 | U | 728 | 921 | 2.5 | 843 | 73 | −1.8 | 0.0000 | 2.3 | 60 | 168 | 544 | 44 | 83 | EXAMPLE |
| 86 | U | 728 | 921 | 3.0 | 901 | 57 | −2.0 | 0.0000 | 2.5 | 63 | 181 | 517 | 43 | 53 | EXAMPLE |
| 87 | U | 728 | 921 | 3.6 | 889 | 81 | −1.5 | 0.0000 | 2.4 | 74 | 178 | 551 | 37 | 60 | EXAMPLE |
| 88 | V | 744 | 890 | 4.1 | 817 | 67 | −2.1 | 0.0000 | 2.8 | 69 | 129 | 490 | 42 | 81 | EXAMPLE |
| 89 | V | 744 | 890 | 2.6 | 865 | 99 | −1.1 | 0.0000 | 2.4 | 77 | 112 | 526 | 33 | 67 | EXAMPLE |
| 90 | V | 744 | 890 | 3.1 | 834 | 34 | −1.0 | 0.0000 | 3.1 | 61 | 167 | 497 | 42 | 527 | EXAMPLE |
| 91 | W | 716 | 821 | 2.5 | 786 | 108 | −1.4 | 0.0000 | 3.1 | 32 | 81 | 549 | 47 | 47 | EXAMPLE |
| 92 | W | 716 | 821 | 3.9 | 803 | 58 | −1.5 | 0.0000 | 3.1 | 25 | 80 | 527 | 48 | 48 | EXAMPLE |
| 93 | W | 716 | 821 | 4.3 | 782 | 55 | −1.6 | 0.0000 | 2.5 | 39 | 85 | 492 | 32 | 54 | EXAMPLE |
| 94 | W | 716 | 821 | 3.2 | 812 | 94 | −1.4 | 0.0000 | 1.8 | 33 | 81 | 495 | 32 | 70 | COMPARATIVE EXAMPLE |
| 95 | X | 733 | 1024 | 2.6 | 933 | 32 | −0.9 | 0.0000 | 1.9 | 14 | 416 | 528 | 25 | 51 | EXAMPLE |
| 96 | X | 733 | 1024 | 4.0 | 836 | 61 | −1.0 | 0.0000 | 2.9 | 20 | 397 | 539 | 26 | 73 | EXAMPLE |
| 97 | X | 733 | 1024 | 4.1 | 943 | 90 | −1.7 | 0.0000 | 2.9 | 18 | 401 | 498 | 51 | 78 | EXAMPLE |
| 98 | X | 733 | 1024 | 3.4 | 896 | 72 | −2.3 | 0.0000 | 3.0 | 19 | 405 | 520 | 47 | 68 | COMPARATIVE EXAMPLE |
| 99 | Y | 730 | 874 | 3.9 | 847 | 107 | −1.3 | 0.0000 | 3.1 | 18 | 33 | 538 | 35 | 68 | EXAMPLE |
| 100 | Y | 730 | 874 | 2.6 | 834 | 51 | −1.1 | 0.0000 | 2.6 | 18 | 39 | 516 | 39 | 76 | EXAMPLE |
| 101 | Y | 730 | 874 | 4.5 | 815 | 38 | −1.1 | 0.0000 | 2.0 | 17 | 43 | 499 | 36 | 46 | EXAMPLE |
| 102 | Y | 730 | 874 | 3.2 | 814 | 103 | −1.9 | 0.0000 | 3.4 | 14 | 36 | 529 | 37 | 46 | EXAMPLE |
| 103 | Z | 708 | 800 | 2.6 | 780 | 102 | −1.2 | 0.0000 | 3.2 | 15 | 39 | 551 | 52 | 83 | EXAMPLE |
| 104 | Z | 708 | 800 | 3.7 | 774 | 103 | −1.6 | 0.0000 | 3.3 | 17 | 47 | 529 | 43 | 47 | EXAMPLE |
| 105 | Z | 708 | 800 | 2.8 | 781 | 86 | −1.1 | 0.0000 | 1.8 | 16 | 32 | 542 | 28 | 42 | EXAMPLE |
| 106 | Z | 708 | 800 | 3.2 | 793 | 76 | −1.0 | 0.0000 | 3.1 | 9 | 35 | 550 | 33 | 44 | EXAMPLE |
| 107 | AA | 719 | 886 | 3.2 | 800 | 35 | −2.0 | 0.0000 | 2.2 | 52 | 50 | 550 | 29 | 70 | COMPARATIVE EXAMPLE |
| 108 | AB | 701 | 774 | 3.9 | 769 | 30 | −1.7 | 0.0000 | 2.6 | 45 | 49 | 491 | 39 | 35 | COMPARATIVE EXAMPLE |
| 109 | AC | 730 | 872 | 3.4 | 846 | 57 | −1.4 | 0.0000 | 2.1 | 61 | 46 | 544 | 44 | 56 | COMPARATIVE EXAMPLE |

TABLE 11

| EXPERIMENTAL EXAMPLE | CHEMICAL COMPONENT | SHEET THICKNESS mm | Ac1 | Ac3 °C. | AVERAGE HEATING RATE °C./SECOND | MAXIMUM HEATING TEMPERATURE °C. | CONTINUOUS ANNEALING STEP RETENTION TIME SECOND | log (PH2O/PH2) | NUMBER OF TIMES OF BENDING-UNBENDING DEFORMATION PROCESSING NUMBER OF TIMES | MINIMUM ROLL RADIUS mm | AVERAGE ROLL RADIUS mm |
|---|---|---|---|---|---|---|---|---|---|---|---|
| 201 | BA | 1.00 | 735 | 965 | 3.3 | 910 | 135 | −1.8 | 8 | 500 | 500 |
| 202 | BA | 0.75 | 735 | 965 | 4.1 | 916 | 141 | −1.3 | 8 | 80 | 300 |
| 203 | BA | 0.50 | 735 | 965 | 4.0 | 901 | 154 | −1.5 | 6 | 500 | 500 |
| 204 | BB | 2.50 | 720 | 846 | 3.1 | 810 | 137 | −1.7 | 6 | 75 | 100 |
| 205 | BB | 3.20 | 720 | 846 | 3.4 | 820 | 251 | −1.6 | 6 | 75 | 358 |
| 206 | BB | 2.50 | 720 | 846 | 4.1 | 823 | 137 | −1.7 | 6 | 300 | 500 |
| 207 | BC | 2.00 | 727 | 864 | 3.8 | 825 | 124 | −1.8 | 7 | 750 | 750 |
| 208 | BC | 2.00 | 727 | 864 | 3.4 | 829 | 155 | −1.6 | 8 | 750 | 750 |
| 209 | BC | 0.80 | 727 | 864 | 3.6 | 844 | 150 | −1.7 | 6 | 1500 | 1500 |
| 210 | BD | 0.80 | 719 | 880 | 3.9 | 837 | 137 | −1.3 | 2 | 600 | 600 |
| 211 | BD | 1.00 | 719 | 880 | 3.7 | 858 | 148 | −1.3 | 12 | 300 | 300 |
| 212 | BD | 8.00 | 719 | 880 | 3.1 | 850 | 160 | −1.5 | 2 | 65 | 150 |
| 213 | BE | 3.50 | 710 | 847 | 3.8 | 815 | 148 | −1.4 | 7 | 65 | 333 |
| 214 | BE | 0.87 | 710 | 847 | 3.2 | 815 | 221 | −1.2 | 5 | 400 | 400 |
| 215 | BE | 10.0 | 710 | 847 | 4.0 | 811 | 146 | −1.6 | 4 | 90 | 295 |
| 216 | BF | 0.70 | 713 | 827 | 3.8 | 799 | 157 | −1.6 | 8 | 750 | 750 |
| 217 | BF | 1.33 | 713 | 827 | 4.1 | 797 | 138 | −1.6 | 8 | 300 | 500 |
| 218 | BF | 0.75 | 713 | 827 | 3.5 | 803 | 125 | −1.7 | 2 | 1200 | 1200 |

| EXPERIMENTAL EXAMPLE | MAXIMUM TOTAL STRAIN | MAXIMUM AMOUNT PER BENDING PROCESSING | Δε | CONTINUOUS ANNEALING STEP AVERAGE COOLING RATE OF 740° C. TO 650° C. °C./SECOND | AVERAGE COOLING RATE OF 650° C. TO 500° C. °C./SECOND | RETENTION TIME SECOND | ALLOYING STEP ALLOYING TEMPERATURE °C. | TREATMENT TIME SECOND | RETENTION TIME SECOND | |
|---|---|---|---|---|---|---|---|---|---|---|
| 201 | 0.0080 | 0.0020 | 0.0000 | 2.3 | 33 | 158 | 475 | 30 | 37 | EXAMPLE |
| 202 | 0.0159 | 0.0093 | 0.0009 | 2.3 | 39 | 203 | 483 | 31 | 36 | EXAMPLE |
| 203 | 0.0040 | 0.0010 | 0.0000 | 2.7 | 41 | 197 | 500 | 36 | 33 | COMPARATIVE EXAMPLE |
| 204 | 0.0758 | 0.0323 | 0.0000 | 2.8 | 16 | 139 | 496 | 26 | 39 | EXAMPLE |
| 205 | 0.0536 | 0.0409 | 0.0000 | 2.3 | 19 | 155 | 512 | 33 | 42 | EXAMPLE |
| 206 | 0.0248 | 0.0083 | 0.0141 | 2.5 | 21 | 184 | 501 | 39 | 40 | COMPARATIVE EXAMPLE |
| 207 | 0.0106 | 0.0027 | 0.0027 | 2.8 | 38 | 181 | 505 | 25 | 35 | EXAMPLE |
| 208 | 0.0106 | 0.0027 | 0.0000 | 2.9 | 42 | 135 | 491 | 37 | 41 | EXAMPLE |
| 209 | 0.0015 | 0.0005 | 0.0000 | 2.9 | 40 | 153 | 514 | 32 | 33 | COMPARATIVE EXAMPLE |

TABLE 11-continued

| | | | | | | | | |
|---|---|---|---|---|---|---|---|---|
| 210 | 0.0013 | 0.0013 | 0.0000 | 2.8 | 48 | 179 | 500 | 34 | 32 | EXAMPLE |
| 211 | 0.0198 | 0.0033 | 0.0000 | 2.7 | 57 | 201 | 488 | 38 | 34 | EXAMPLE |
| 212 | 0.1096 | 0.1096 | 0.0767 | 2.8 | 50 | 164 | 518 | 30 | 33 | COMPARATIVE EXAMPLE |
| 213 | 0.0753 | 0.0511 | 0.0044 | 2.2 | 38 | 145 | 488 | 36 | 33 | EXAMPLE |
| 214 | 0.0065 | 0.0022 | 0.0022 | 2.3 | 42 | 178 | 517 | 29 | 33 | EXAMPLE |
| 215 | 0.1196 | 0.1000 | 0.0000 | 2.3 | 40 | 167 | 487 | 37 | 41 | COMPARATIVE EXAMPLE |
| 216 | 0.0036 | 0.0009 | 0.0000 | 2.5 | 54 | 188 | 503 | 40 | 35 | EXAMPLE |
| 217 | 0.0078 | 0.0044 | 0.0006 | 2.9 | 47 | 145 | 475 | 31 | 33 | EXAMPLE |
| 218 | 0.0006 | 0.0006 | 0.0000 | 2.2 | 56 | 169 | 506 | 39 | 36 | COMPARATIVE EXAMPLE |

The $Ac_1$ transformation point and the $Ac_3$ transformation point in Table 8 to Table 11 were obtained by cutting out a small piece from the steel sheets treated under the conditions of Tables 4 to 7 before performing annealing processing, and measuring a cubical expansion curve thereof when heated by 10° C./second.

In annealing, a decarburization treatment was performed including passing in the temperature range between 600° C. and $Ac_1$ transformation point at an average heating rate described in Table 8 to Table 11, heating to a maximum heating temperature (annealing temperature) described in Table 8 to Table 118, and retaining for a retention time (retention time in the continuous annealing step) described in Table 8 to Table 11 in an atmosphere mainly constituted of nitrogen in which water partial pressure and hydrogen partial pressure ($\log(PH_2O/PH_2)$) is controlled under the conditions described in Table 8 to Table 11.

In the decarburization treatment (in the continuous annealing step), in experimental examples 1 to 12 and experimental examples 16 to 29, a roll with a radius of 450 mm was used and bending-unbending deformation processing was performed 6 times in total. In experimental examples 13 to 15, a roll with a radius of 450 mm was used and bending-unbending deformation processing was performed 7 times in total. In experimental examples 30 to 44, a roll with a radius of 730 mm was used and bending-unbending deformation processing was performed 4 times in total. In experimental examples 45 to 48, experimental examples 55 to 69, and experimental examples 73 to 109, a roll with a radius of 600 mm was used and bending-unbending deformation processing was performed 6 times in total. In experimental examples 49 to 54 and experimental examples 70 to 72, a roll with a radius of 780 mm was used and bending-unbending deformation processing was performed 6 times in total.

On the other hand, in experimental examples 201 to 218, bending-unbending deformation processing was performed plural times (2 to 12 times) by the number of times of bending-unbending deformation processing illustrated in Table 11. Further, in experimental examples 201 to 218, the radius of the roll for performing the bending-unbending deformation processing was varied. Minimum roll radii (mm) and average roll radii (mm) of the rolls used for the respective bending-unbending deformation processing performed in experimental examples 201 to 218 are illustrated in Table 11. Further, in the bending-unbending deformation processing, among total strain amounts introduced respectively into a front surface and a rear surface of the steel sheet, a larger strain amount is illustrated as a maximum total strain. Further, in experimental examples 201 to 218, the sheet thickness of the steel sheet was varied from 0.70 to 8.00 mm.

$\Delta \epsilon$ described in Table 8 to Table 11 indicates the absolute value of a difference in strain amounts introduced by performing the bending-unbending deformation processing, which are calculated for each of the front and rear surface of the steel sheet.

Thereafter, cooling at an average cooling rate illustrated in Table 8 to Table 11 in the temperature range of 740° C. to 650° C. was performed, and cooling at an average cooling rate illustrated in Table 8 to Table 11 in the temperature range of 650° C. to 500° C. was performed. Note that in experimental examples 47 and 52, when the steel sheet was cooled in the temperature range of 740° C. to 650° C., the atmosphere in a cooling bath was set so that log(water partial pressure/hydrogen partial pressure)=−4.0.

Next, the steel sheet after cooling was retained for a retention time (retention time between the continuous annealing step and an alloying treatment) described in Table 8 to Table 11 in the temperature range of 500 to 400° C. Thereafter, an alloying treatment was performed including dipping the steel sheet in a galvanizing bath and retaining for a retention time described in Table 8 to Table 11 at the temperature described in Table 8 to Table 11.

After the alloying treatment, the steel sheet was retained in the temperature range of 200 to 350° C. for a retention time described in Table 8 to Table 11 (retention time of alloying treatment).

After cooling to room temperature, cold rolling with a reduction ratio of 0.15% was performed in experimental examples 7 to 34, cold rolling with a reduction ratio of 1.50% was performed in experimental example 53, cold rolling with a reduction ratio of 1.00% was performed in experimental example 54, and cold rolling with a reduction ratio of 0.25% was performed in conditions 61 to 100.

Thereafter, in experimental examples 9 and 49, a coating film constituted of composite oxide containing P in the surface layer of the galvanized steel sheet was added.

Experimental examples 9 and 49 are examples in which a coating film constituted of composite oxide containing P in the surface layer of the alloyed hot-dip galvanized steel sheet was added, and a high-strength alloyed hot-dip galvanized steel sheet excellent in formability can be obtained.

Microstructures in the range of ⅛ thickness to ⅜ thickness in the steel sheets of experimental examples 1 to 109 and 201 to 218 were observed and volume fractions were measured. Results thereof are illustrated in Table 12 to Table 15. In Table 12 to Table 15, "F" means ferrite, "B" means bainite, "BF" means bainitic ferrite, "TM" means tempered martensite, "M" means fresh martensite, and "retained γ" means retained austenite.

Among the microstructure fractions, the amount of retained austenite was measured by X-ray diffraction, and others were obtained by nital etching a cross section obtained by cutting out and mirror polishing a thicknesswise cross section in parallel with the rolling direction of the steel sheet, and observing the cross section using a field emission scanning electron microscope (FE-SEM).

Further, the content of iron in ½ thickness of the alloyed galvanized layer was measured using EDX. Results thereof are illustrated in Table 12 to Table 15.

TABLE 12

| EXPERIMENTAL EXAMPLE | CHEMICAL COMPONENT | MICROSTRUCTURE OBSERVATION RESULT VOLUME FRACTION | | | | | | ALLOYED GALVANIZED LAYER | |
|---|---|---|---|---|---|---|---|---|---|
| | | F % | B % | BF % | TM % | M % | RETAINED γ % | OTHERS % | Fe CONTENT % | |
| 1 | A | 52 | 16 | 18 | 11 | 0 | 3 | 0 | 11.0 | EXAMPLE |
| 2 | A | 54 | 20 | 11 | 11 | 1 | 2 | 1 | 10.9 | EXAMPLE |
| 3 | A | 46 | 29 | 7 | 14 | 2 | 2 | 0 | 10.7 | EXAMPLE |
| 4 | A | 51 | 25 | 10 | 10 | 0 | 4 | 0 | 10.9 | EXAMPLE |
| 5 | A | 62 | 11 | 3 | 10 | 3 | 3 | 8 | 10.8 | COMPARATIVE EXAMPLE |
| 6 | A | 56 | 14 | 15 | 13 | 0 | 2 | 0 | 11.3 | COMPARATIVE EXAMPLE |
| 7 | B | 59 | 0 | 22 | 13 | 1 | 5 | 0 | 10.5 | EXAMPLE |
| 8 | B | 61 | 4 | 20 | 10 | 0 | 5 | 0 | 10.7 | EXAMPLE |
| 9 | B | 56 | 4 | 19 | 15 | 0 | 5 | 1 | 10.5 | EXAMPLE |
| 10 | B | 44 | 8 | 16 | 19 | 3 | 6 | 4 | 10.9 | EXAMPLE |
| 11 | B | 78 | 0 | 0 | 0 | 0 | 2 | 22 | 10.4 | COMPARATIVE EXAMPLE |
| 12 | B | 13 | 14 | 24 | 33 | 2 | <u>13</u> | 1 | 9.0 | COMPARATIVE EXAMPLE |
| 13 | C | 24 | 24 | 13 | 33 | 2 | 4 | 0 | 9.8 | EXAMPLE |
| 14 | C | 33 | 27 | 3 | 29 | 0 | 6 | 2 | 11.0 | EXAMPLE |
| 15 | C | 27 | 22 | 8 | 34 | 0 | 6 | 3 | 10.9 | EXAMPLE |
| 16 | C | 33 | 16 | 8 | 33 | 0 | 8 | 2 | 10.4 | EXAMPLE |
| 17 | C | 25 | 23 | 10 | 38 | 0 | 4 | 0 | 9.8 | COMPARATIVE EXAMPLE |
| 18 | C | 27 | 27 | 4 | 35 | 2 | 5 | 0 | 11.3 | COMPARATIVE EXAMPLE |
| 19 | D | 52 | 5 | 18 | 17 | 1 | 5 | 2 | 9.5 | EXAMPLE |
| 20 | D | 52 | 0 | 25 | 16 | 1 | 6 | 0 | 9.6 | EXAMPLE |
| 21 | D | 55 | 10 | 14 | 11 | 3 | 7 | 0 | 9.2 | EXAMPLE |
| 22 | D | 47 | 9 | 23 | 16 | 0 | 4 | 1 | 9.5 | EXAMPLE |
| 23 | D | 49 | 10 | 19 | 16 | 0 | 5 | 1 | 11.7 | COMPARATIVE EXAMPLE |
| 24 | D | 52 | 11 | 20 | 10 | 2 | 5 | 0 | <u>7.5</u> | COMPARATIVE EXAMPLE |
| 25 | E | 19 | 27 | 18 | 31 | 1 | 3 | 1 | 10.6 | EXAMPLE |
| 26 | E | 21 | 34 | 15 | 26 | 3 | 0 | 1 | 10.2 | EXAMPLE |
| 27 | E | 15 | 28 | 13 | 40 | 1 | 3 | 0 | 10.9 | EXAMPLE |
| 28 | E | 23 | 21 | 15 | 36 | 2 | 2 | 1 | 10.8 | COMPARATIVE EXAMPLE |
| 29 | E | 18 | 20 | 30 | 28 | 0 | 4 | 0 | 11.8 | COMPARATIVE EXAMPLE |
| 30 | F | 39 | 26 | 15 | 11 | 3 | 5 | 1 | 10.3 | EXAMPLE |
| 31 | F | 33 | 32 | 8 | 22 | 2 | 3 | 0 | 9.9 | EXAMPLE |
| 32 | F | 35 | 30 | 12 | 18 | 2 | 3 | 0 | 10.1 | EXAMPLE |
| 33 | F | 71 | 5 | 2 | 5 | 13 | 4 | 0 | 10.6 | COMPARATIVE EXAMPLE |
| 34 | F | 8 | 59 | 11 | 16 | 0 | 5 | 1 | 11.1 | COMPARATIVE EXAMPLE |
| 35 | G | 62 | 0 | 14 | 14 | 3 | 7 | 0 | 9.3 | EXAMPLE |
| 36 | G | 42 | 0 | 28 | 24 | 0 | 5 | 1 | 8.5 | EXAMPLE |
| 37 | G | 37 | 2 | 31 | 25 | 1 | 4 | 0 | 9.9 | EXAMPLE |
| 38 | G | 35 | 12 | 24 | 18 | 2 | 2 | 7 | <u>14.4</u> | COMPARATIVE EXAMPLE |
| 39 | G | 39 | 5 | 27 | 23 | 0 | 6 | 0 | <u>6.0</u> | COMPARATIVE EXAMPLE |

TABLE 13

| EXPERIMENTAL EXAMPLE | CHEMICAL COMPONENT | MICROSTRUCTURE OBSERVATION RESULT VOLUME FRACTION | | | | | | ALLOYED GALVANIZED LAYER | |
|---|---|---|---|---|---|---|---|---|---|
| | | F % | B % | BF % | TM % | M % | RETAINED γ % | OTHERS % | Fe CONTENT % | |
| 40 | H | 36 | 25 | 16 | 17 | 0 | 5 | 1 | 9.6 | EXAMPLE |
| 41 | H | 18 | 20 | 28 | 29 | 1 | 4 | 0 | 11.0 | EXAMPLE |
| 42 | H | 20 | 26 | 19 | 30 | 0 | 4 | 1 | 10.1 | EXAMPLE |
| 43 | H | 14 | 10 | 27 | 41 | 1 | 5 | 2 | <u>6.4</u> | COMPARATIVE EXAMPLE |
| 44 | H | 23 | 15 | 24 | 26 | 1 | 2 | 9 | <u>14.6</u> | COMPARATIVE EXAMPLE |

TABLE 13-continued

| EXPERIMENTAL EXAMPLE | CHEMICAL COMPONENT | MICROSTRUCTURE OBSERVATION RESULT VOLUME FRACTION | | | | | | ALLOYED GALVANIZED LAYER | |
|---|---|---|---|---|---|---|---|---|---|
| | | F % | B % | BF % | TM % | M % | RETAINED γ % | OTHERS % | Fe CONTENT % |
| 45 | I | 31 | 28 | 18 | 19 | 0 | 4 | 0 | 10.4 | EXAMPLE |
| 46 | I | 41 | 23 | 10 | 23 | 0 | 3 | 0 | 10.6 | EXAMPLE |
| 47 | I | 23 | 24 | 14 | 35 | 1 | 3 | 0 | 11.0 | EXAMPLE |
| 48 | I | 32 | 20 | 12 | 31 | 2 | 2 | 1 | 11.3 | EXAMPLE |
| 49 | I | 34 | 18 | 6 | 37 | 1 | 4 | 0 | 9.6 | EXAMPLE |
| 50 | J | 43 | 9 | 21 | 19 | 0 | 6 | 2 | 9.8 | EXAMPLE |
| 51 | J | 52 | 7 | 19 | 17 | 0 | 5 | 0 | 8.4 | EXAMPLE |
| 52 | J | 67 | 4 | 12 | 11 | 0 | 6 | 0 | 10.0 | EXAMPLE |
| 53 | J | 66 | 0 | 14 | 14 | 1 | 4 | 1 | 10.8 | EXAMPLE |
| 54 | J | 61 | 3 | 9 | 21 | 1 | 5 | 0 | 9.2 | EXAMPLE |
| 55 | K | 42 | 29 | 13 | 13 | 0 | 2 | 1 | 10.8 | EXAMPLE |
| 56 | K | 42 | 30 | 15 | 11 | 2 | 0 | 0 | 11.0 | EXAMPLE |
| 57 | K | 25 | 36 | 22 | 14 | 1 | 1 | 1 | 10.4 | EXAMPLE |
| 58 | L | 34 | 23 | 7 | 32 | 0 | 3 | 1 | 10.6 | EXAMPLE |
| 59 | L | 59 | 13 | 4 | 19 | 1 | 2 | 2 | 11.4 | EXAMPLE |
| 60 | L | 21 | 29 | 9 | 39 | 0 | 2 | 0 | 10.5 | EXAMPLE |
| 61 | M | 28 | 9 | 23 | 34 | 1 | 4 | 1 | 9.8 | EXAMPLE |
| 62 | M | 53 | 6 | 12 | 22 | 0 | 5 | 2 | 9.5 | EXAMPLE |
| 63 | M | 26 | 13 | 21 | 35 | 0 | 5 | 0 | 9.7 | EXAMPLE |
| 64 | N | 52 | 3 | 28 | 10 | 1 | 6 | 0 | 9.6 | EXAMPLE |
| 65 | N | 66 | 2 | 16 | 10 | 0 | 5 | 1 | 10.2 | EXAMPLE |
| 66 | N | 36 | 5 | 35 | 17 | 0 | 7 | 0 | 8.8 | EXAMPLE |
| 67 | O | 38 | 17 | 23 | 16 | 0 | 5 | 1 | 9.7 | EXAMPLE |
| 68 | O | 46 | 13 | 19 | 14 | 1 | 5 | 2 | 9.6 | EXAMPLE |
| 69 | O | 53 | 12 | 14 | 14 | 0 | 5 | 2 | 9.8 | EXAMPLE |
| 70 | P | 37 | 16 | 16 | 26 | 0 | 4 | 1 | 10.5 | EXAMPLE |
| 71 | P | 23 | 23 | 19 | 27 | 2 | 6 | 0 | 10.5 | EXAMPLE |
| 72 | P | 27 | 19 | 19 | 26 | 0 | 5 | 4 | 11.0 | EXAMPLE |
| 73 | Q | 15 | 23 | 17 | 43 | 0 | 2 | 0 | 10.8 | EXAMPLE |
| 74 | Q | 27 | 17 | 12 | 35 | 3 | 5 | 1 | 10.9 | EXAMPLE |
| 75 | Q | 22 | 22 | 15 | 38 | 0 | 3 | 0 | 10.4 | EXAMPLE |
| 76 | R | 70 | 4 | 8 | 11 | 0 | 5 | 2 | 10.0 | EXAMPLE |
| 77 | R | 61 | 4 | 15 | 14 | 0 | 5 | 1 | 10.1 | EXAMPLE |
| 78 | R | 59 | 6 | 12 | 14 | 0 | 6 | 3 | 10.0 | EXAMPLE |
| 79 | S | 41 | 15 | 12 | 28 | 0 | 4 | 0 | 10.9 | EXAMPLE |

TABLE 14

| EXPERIMENTAL EXAMPLE | CHEMICAL COMPONENT | MICROSTRUCTURE OBSERVATION RESULT VOLUME FRACTION | | | | | | ALLOYED GALVANIZED LAYER | |
|---|---|---|---|---|---|---|---|---|---|
| | | F % | B % | BF % | TM % | M % | RETAINED γ % | OTHERS % | Fe CONTENT % |
| 80 | S | 29 | 20 | 13 | 32 | 0 | 5 | 1 | 11.6 | EXAMPLE |
| 81 | S | 29 | 18 | 16 | 32 | 1 | 4 | 0 | 10.4 | EXAMPLE |
| 82 | T | 43 | 10 | 16 | 27 | 0 | 3 | 1 | 10.3 | EXAMPLE |
| 83 | T | 47 | 10 | 15 | 23 | 0 | 5 | 0 | 10.5 | EXAMPLE |
| 84 | T | 37 | 13 | 17 | 27 | 0 | 5 | 1 | 9.8 | EXAMPLE |
| 85 | U | 58 | 10 | 8 | 19 | 0 | 4 | 1 | 10.4 | EXAMPLE |
| 86 | U | 34 | 18 | 12 | 32 | 1 | 2 | 1 | 10.3 | EXAMPLE |
| 87 | U | 32 | 18 | 11 | 33 | 0 | 5 | 1 | 10.1 | EXAMPLE |
| 88 | V | 67 | 0 | 13 | 14 | 0 | 6 | 0 | 10.1 | EXAMPLE |
| 89 | V | 28 | 3 | 25 | 35 | 1 | 7 | 1 | 9.8 | EXAMPLE |
| 90 | V | 55 | 0 | 18 | 20 | 0 | 5 | 2 | 8.4 | EXAMPLE |
| 91 | W | 46 | 17 | 11 | 21 | 2 | 3 | 0 | 10.7 | EXAMPLE |
| 92 | W | 33 | 27 | 13 | 24 | 0 | 3 | 0 | 11.0 | EXAMPLE |
| 93 | W | 56 | 13 | 7 | 17 | 0 | 5 | 2 | 10.4 | EXAMPLE |
| 94 | W | 28 | 23 | 14 | 28 | 0 | 3 | 4 | 11.3 | COMPARATIVE EXAMPLE |
| 95 | X | 68 | 18 | 2 | 12 | 0 | 0 | 0 | 10.4 | EXAMPLE |
| 96 | X | 73 | 12 | 3 | 11 | 0 | 0 | 1 | 10.8 | EXAMPLE |
| 97 | X | 53 | 25 | 0 | 17 | 3 | 2 | 0 | 10.8 | EXAMPLE |
| 98 | X | 61 | 23 | 1 | 13 | 1 | 0 | 1 | 10.8 | COMPARATIVE EXAMPLE |
| 99 | Y | 25 | 16 | 33 | 25 | 1 | 0 | 0 | 9.6 | EXAMPLE |
| 100 | Y | 38 | 14 | 22 | 19 | 2 | 5 | 0 | 9.5 | EXAMPLE |
| 101 | Y | 58 | 8 | 16 | 12 | 1 | 4 | 1 | 8.9 | EXAMPLE |

TABLE 14-continued

| | | MICROSTRUCTURE OBSERVATION RESULT VOLUME FRACTION | | | | | | | ALLOYED GALVANIZED LAYER Fe | |
|---|---|---|---|---|---|---|---|---|---|---|
| EXPERIMENTAL EXAMPLE | CHEMICAL COMPONENT | F % | B % | BF % | TM % | M % | RETAINED γ % | OTHERS % | CONTENT % | |
| 102 | Y | 62 | 7 | 12 | 13 | 0 | 5 | 1 | 9.9 | EXAMPLE |
| 103 | Z | 29 | 23 | 23 | 21 | 1 | 3 | 0 | 10.2 | EXAMPLE |
| 104 | Z | 34 | 21 | 21 | 19 | 0 | 5 | 0 | 10.8 | EXAMPLE |
| 105 | Z | 28 | 22 | 25 | 22 | 0 | 3 | 0 | 10.2 | EXAMPLE |
| 106 | Z | 13 | 28 | 30 | 22 | 1 | 4 | 2 | 10.5 | EXAMPLE |
| 107 | AA | 99 | 0 | 0 | 0 | 0 | 0 | 1 | 11.3 | COMPARATIVE EXAMPLE |
| 108 | AB | 57 | 5 | 13 | 14 | 4 | 5 | 2 | 11.0 | COMPARATIVE EXAMPLE |
| 109 | AC | 75 | 0 | 14 | 0 | 1 | <u>10</u> | 0 | 10.3 | COMPARATIVE EXAMPLE |

TABLE 15

| | | MICROSTRUCTURE OBSERVATION RESULT VOLUME FRACTION | | | | | | | PLATING | |
|---|---|---|---|---|---|---|---|---|---|---|
| EXPERIMENTAL EXAMPLE | CHEMICAL COMPONENT | F % | B % | BF % | TM % | M % | RETAINED γ % | OTHERS % | Fe % % | |
| 201 | BA | 42 | 23 | 19 | 15 | 1 | 0 | 0 | 10.4 | EXAMPLE |
| 202 | BA | 44 | 17 | 11 | 13 | 8 | 4 | 2 | 9.7 | EXAMPLE |
| 203 | BA | 39 | 21 | 16 | 14 | 5 | 2 | 3 | 11.0 | COMPARATIVE EXAMPLE |
| 204 | BB | 29 | 2 | 35 | 15 | 11 | 6 | 2 | 8.7 | EXAMPLE |
| 205 | BB | 35 | 3 | 27 | 27 | 0 | 7 | 1 | 8.4 | EXAMPLE |
| 206 | BB | 38 | 0 | 37 | 14 | 4 | 5 | 2 | 8.7 | COMPARATIVE EXAMPLE |
| 207 | BC | 44 | 9 | 19 | 16 | 4 | 6 | 2 | 8.8 | EXAMPLE |
| 208 | BC | 45 | 8 | 19 | 24 | 0 | 4 | 0 | 11.2 | EXAMPLE |
| 209 | BC | 44 | 7 | 24 | 18 | 0 | 5 | 2 | 8.7 | COMPARATIVE EXAMPLE |
| 210 | BD | 65 | 13 | 3 | 18 | 3 | 0 | 0 | 9.5 | EXAMPLE |
| 211 | BD | 59 | 25 | 0 | 12 | 1 | 3 | 0 | 10.2 | EXAMPLE |
| 212 | BD | 56 | 18 | 3 | 17 | 4 | 2 | 0 | 10.3 | COMPARATIVE EXAMPLE |
| 213 | BE | 36 | 12 | 24 | 24 | 2 | 2 | 0 | 9.1 | EXAMPLE |
| 214 | BE | 43 | 7 | 21 | 15 | 7 | 5 | 2 | 10.0 | EXAMPLE |
| 215 | BE | 40 | 13 | 24 | 17 | 1 | 4 | 1 | 9.0 | COMPARATIVE EXAMPLE |
| 216 | BF | 29 | 14 | 37 | 15 | 2 | 3 | 0 | 10.3 | EXAMPLE |
| 217 | BF | 28 | 18 | 25 | 17 | 4 | 6 | 2 | 9.7 | EXAMPLE |
| 218 | BF | 30 | 13 | 28 | 19 | 7 | 2 | 1 | 10.1 | COMPARATIVE EXAMPLE |

Hardness of experimental examples 1 to 109 and 201 to 218 was measured by a method described below. Results thereof are illustrated in Table 16 to Table 19.

Regarding hardness of the surface layer and ¼ thickness of the base steel sheet, Vickers hardness was measured at five points, which are separated by 1 mm or more from each other in the rolling direction, the maximum value and the minimum value were discarded, and the average value of remaining three positions was employed. In the measurement of Vickers hardness, the load was 100 gf. Note that the Vickers hardness of the surface layer was measured on a line entering the base steel sheet side by 40 μm from the interface between the alloyed galvanized layer and the base steel sheet.

Kurtosis K* of hardness distribution was calculated using results of measuring hardness by push-in depth measurement method with a push-in load of 1 g weight by using a dynamic micro hardness tester having a Berkovich type triangular pyramid indenter. Note that the measurement position of hardness was in the range of ⅛ thickness to ⅜ thickness with ¼ of the sheet thickness being the center in the thicknesswise cross section perpendicular to the sheet surface of the steel sheet and in parallel with the rolling direction (rolling reduction direction). Further, the total number of measurement values of hardness was set to 1000.

TABLE 16

| | | HARDNESS MEASUREMENT RESULT | | | | |
|---|---|---|---|---|---|---|
| | | ¼ THICKNESS | | SURFACE LAYER | (SURFACE LAYER HARDNESS)/ (¼ | |
| EXPERIMENTAL EXAMPLE | CHEMICAL COMPONENT | AVERAGE HARDNESS | KURTOSIS | AVERAGE HARDNESS | THICKNESS HARDNESS) | |
| 1 | A | 279 | −0.47 | 156 | 0.56 | EXAMPLE |
| 2 | A | 297 | −0.47 | 136 | 0.46 | EXAMPLE |
| 3 | A | 309 | −0.42 | 142 | 0.46 | EXAMPLE |
| 4 | A | 301 | −0.45 | 137 | 0.45 | EXAMPLE |
| 5 | A | 292 | −0.42 | 210 | 0.72 | COMPARATIVE EXAMPLE |
| 6 | A | 305 | −0.36 | 67 | 0.22 | COMPARATIVE EXAMPLE |
| 7 | B | 263 | −0.58 | 128 | 0.49 | EXAMPLE |
| 8 | B | 289 | −0.58 | 150 | 0.52 | EXAMPLE |
| 9 | B | 297 | −0.41 | 147 | 0.50 | EXAMPLE |
| 10 | B | 300 | −0.45 | 172 | 0.57 | EXAMPLE |
| 11 | B | 218 | −0.39 | 116 | 0.53 | COMPARATIVE EXAMPLE |
| 12 | B | 298 | −0.36 | 163 | 0.55 | COMPARATIVE EXAMPLE |
| 13 | C | 408 | −0.35 | 167 | 0.48 | EXAMPLE |
| 14 | C | 377 | −0.39 | 182 | 0.48 | EXAMPLE |
| 15 | C | 339 | −0.34 | 163 | 0.48 | EXAMPLE |
| 16 | C | 367 | −0.40 | 174 | 0.48 | EXAMPLE |
| 17 | C | 368 | −0.42 | 343 | 0.93 | COMPARATIVE EXAMPLE |
| 18 | C | 338 | −0.41 | 100 | 0.30 | COMPARATIVE EXAMPLE |
| 19 | D | 337 | −0.39 | 147 | 0.44 | EXAMPLE |
| 20 | D | 352 | −0.52 | 212 | 0.60 | EXAMPLE |
| 21 | D | 335 | −0.56 | 140 | 0.42 | EXAMPLE |
| 22 | D | 316 | −0.47 | 163 | 0.51 | EXAMPLE |
| 23 | D | 314 | −0.55 | 89 | 0.28 | COMPARATIVE EXAMPLE |
| 24 | D | 327 | −0.46 | 290 | 0.89 | COMPARATIVE EXAMPLE |
| 25 | E | 393 | −0.38 | 189 | 0.48 | EXAMPLE |
| 26 | E | 358 | −0.32 | 197 | 0.55 | EXAMPLE |
| 27 | E | 412 | −0.34 | 192 | 0.47 | EXAMPLE |
| 28 | E | 329 | −0.32 | 272 | 0.83 | COMPARATIVE EXAMPLE |
| 29 | E | 449 | −0.35 | 359 | 0.80 | COMPARATIVE EXAMPLE |
| 30 | F | 311 | −0.36 | 167 | 0.54 | EXAMPLE |
| 31 | F | 330 | −0.43 | 127 | 0.38 | EXAMPLE |
| 32 | F | 317 | −0.45 | 153 | 0.48 | EXAMPLE |
| 33 | F | 393 | 0.13 | 183 | 0.47 | COMPARATIVE EXAMPLE |
| 34 | F | 374 | −0.01 | 220 | 0.59 | COMPARATIVE EXAMPLE |
| 35 | G | 395 | −0.39 | 194 | 0.49 | EXAMPLE |
| 36 | G | 398 | −0.48 | 190 | 0.48 | EXAMPLE |
| 37 | G | 356 | −0.47 | 208 | 0.58 | EXAMPLE |
| 38 | G | 291 | −0.38 | 150 | 0.52 | COMPARATIVE EXAMPLE |
| 39 | G | 339 | −0.42 | 159 | 0.47 | COMPARATIVE EXAMPLE |

TABLE 17

HARDNESS MEASUREMENT RESULT

| EXPERIMENTAL EXAMPLE | CHEMICAL COMPONENT | ¼ THICKNESS AVERAGE HARDNESS | KURTOSIS | SURFACE LAYER AVERAGE HARDNESS | (SURFACE LAYER HARDNESS)/ (¼ THICKNESS HARDNESS) | |
|---|---|---|---|---|---|---|
| 40 | H | 434 | −0.40 | 219 | 0.50 | EXAMPLE |
| 41 | H | 422 | −0.33 | 214 | 0.51 | EXAMPLE |
| 42 | H | 414 | −0.37 | 239 | 0.58 | EXAMPLE |
| 43 | H | 442 | −0.34 | 242 | 0.55 | COMPARATIVE EXAMPLE |
| 44 | H | 292 | −0.37 | 185 | 0.63 | COMPARATIVE EXAMPLE |
| 45 | I | 306 | −0.37 | 188 | 0.61 | EXAMPLE |
| 46 | I | 284 | −0.38 | 174 | 0.61 | EXAMPLE |
| 47 | I | 296 | −0.36 | 166 | 0.56 | EXAMPLE |
| 48 | I | 283 | −0.43 | 142 | 0.50 | EXAMPLE |
| 49 | I | 290 | −0.46 | 195 | 0.67 | EXAMPLE |
| 50 | J | 389 | −0.46 | 214 | 0.55 | EXAMPLE |
| 51 | J | 333 | −0.41 | 146 | 0.44 | EXAMPLE |
| 52 | J | 355 | −0.44 | 182 | 0.51 | EXAMPLE |
| 53 | J | 393 | −0.62 | 251 | 0.64 | EXAMPLE |
| 54 | J | 323 | −0.38 | 176 | 0.55 | EXAMPLE |
| 55 | K | 301 | −0.47 | 138 | 0.46 | EXAMPLE |
| 56 | K | 280 | −0.42 | 159 | 0.57 | EXAMPLE |
| 57 | K | 289 | −0.40 | 125 | 0.43 | EXAMPLE |
| 58 | L | 315 | −0.43 | 153 | 0.49 | EXAMPLE |
| 59 | L | 312 | −0.47 | 172 | 0.55 | EXAMPLE |
| 60 | L | 317 | −0.38 | 145 | 0.46 | EXAMPLE |
| 61 | M | 372 | −0.34 | 226 | 0.61 | EXAMPLE |
| 62 | M | 319 | −0.43 | 139 | 0.44 | EXAMPLE |
| 63 | M | 336 | −0.35 | 154 | 0.46 | EXAMPLE |
| 64 | N | 324 | −0.51 | 164 | 0.50 | EXAMPLE |
| 65 | N | 386 | −0.45 | 172 | 0.45 | EXAMPLE |
| 66 | N | 351 | −0.48 | 188 | 0.53 | EXAMPLE |
| 67 | O | 398 | −0.42 | 211 | 0.53 | EXAMPLE |
| 68 | O | 391 | −0.47 | 213 | 0.55 | EXAMPLE |
| 69 | O | 428 | −0.48 | 212 | 0.49 | EXAMPLE |
| 70 | P | 299 | −0.46 | 126 | 0.42 | EXAMPLE |
| 71 | P | 294 | −0.33 | 137 | 0.47 | EXAMPLE |
| 72 | P | 312 | −0.36 | 145 | 0.47 | EXAMPLE |
| 73 | Q | 327 | −0.33 | 150 | 0.46 | EXAMPLE |
| 74 | Q | 276 | −0.36 | 148 | 0.54 | EXAMPLE |
| 75 | Q | 335 | −0.34 | 129 | 0.38 | EXAMPLE |
| 76 | R | 344 | −0.45 | 182 | 0.53 | EXAMPLE |
| 77 | R | 411 | −0.39 | 186 | 0.45 | EXAMPLE |
| 78 | R | 369 | −0.55 | 175 | 0.47 | EXAMPLE |
| 79 | S | 342 | −0.49 | 178 | 0.52 | EXAMPLE |

TABLE 18

HARDNESS MEASUREMENT RESULT

| EXPERIMENTAL EXAMPLE | CHEMICAL COMPONENT | ¼ THICKNESS AVERAGE HARDNESS | KURTOSIS | SURFACE LAYER AVERAGE HARDNESS | (SURFACE LAYER HARDNESS)/ (¼ THICKNESS HARDNESS) | |
|---|---|---|---|---|---|---|
| 80 | S | 328 | −0.40 | 169 | 0.52 | EXAMPLE |
| 81 | S | 337 | −0.39 | 169 | 0.50 | EXAMPLE |
| 82 | T | 305 | −0.50 | 151 | 0.50 | EXAMPLE |
| 83 | T | 361 | −0.42 | 158 | 0.44 | EXAMPLE |
| 84 | T | 347 | −0.44 | 160 | 0.46 | EXAMPLE |
| 85 | U | 360 | −0.52 | 189 | 0.53 | EXAMPLE |
| 86 | U | 344 | −0.37 | 212 | 0.62 | EXAMPLE |
| 87 | U | 338 | −0.39 | 184 | 0.54 | EXAMPLE |
| 88 | V | 442 | −0.59 | 215 | 0.49 | EXAMPLE |
| 89 | V | 411 | −0.36 | 183 | 0.45 | EXAMPLE |
| 90 | V | 470 | −0.52 | 229 | 0.49 | EXAMPLE |
| 91 | W | 333 | −0.36 | 185 | 0.56 | EXAMPLE |

TABLE 18-continued

HARDNESS MEASUREMENT RESULT

| EXPERIMENTAL EXAMPLE | CHEMICAL COMPONENT | ¼ THICKNESS AVERAGE HARDNESS | KURTOSIS | SURFACE LAYER AVERAGE HARDNESS | (SURFACE LAYER HARDNESS)/ (¼ THICKNESS HARDNESS) | |
|---|---|---|---|---|---|---|
| 92 | W | 371 | −0.46 | 190 | 0.51 | EXAMPLE |
| 93 | W | 323 | −0.43 | 137 | 0.42 | EXAMPLE |
| 94 | W | 301 | −0.35 | 140 | 0.46 | COMPARATIVE EXAMPLE |
| 95 | X | 287 | −0.62 | 103 | 0.36 | EXAMPLE |
| 96 | X | 274 | −0.42 | 172 | 0.63 | EXAMPLE |
| 97 | X | 279 | −0.50 | 130 | 0.47 | EXAMPLE |
| 98 | X | 308 | −0.50 | 178 | 0.58 | COMPARATIVE EXAMPLE |
| 99 | Y | 342 | −0.34 | 166 | 0.48 | EXAMPLE |
| 100 | Y | 359 | −0.40 | 192 | 0.54 | EXAMPLE |
| 101 | Y | 417 | −0.57 | 210 | 0.50 | EXAMPLE |
| 102 | Y | 336 | −0.45 | 134 | 0.40 | EXAMPLE |
| 103 | Z | 416 | −0.45 | 216 | 0.52 | EXAMPLE |
| 104 | Z | 386 | −0.40 | 223 | 0.58 | EXAMPLE |
| 105 | Z | 367 | −0.42 | 210 | 0.57 | EXAMPLE |
| 106 | Z | 433 | −0.34 | 200 | 0.46 | EXAMPLE |
| 107 | AA | 128 | <u>0.82</u> | 116 | <u>0.91</u> | COMPARATIVE EXAMPLE |
| 108 | AB | 311 | −0.41 | 194 | 0.62 | COMPARATIVE EXAMPLE |
| 109 | AC | 294 | −0.35 | 161 | 0.55 | COMPARATIVE EXAMPLE |

TABLE 19

HARDNESS MEASUREMENT RESULT

| EXPERIMENTAL EXAMPLE | CHEMICAL COMPONENT | ¼ THICKNESS AVERAGE HARDNESS | KURTOSIS | SURFACE LAYER AVERAGE HARDNESS | (SURFACE LAYER HARDNESS)/ (¼ THICKNESS HARDNESS) | |
|---|---|---|---|---|---|---|
| 201 | BA | 302 | −0.36 | 133 | 0.44 | EXAMPLE |
| 202 | BA | 302 | −0.41 | 181 | 0.60 | EXAMPLE |
| 203 | BA | 314 | −0.38 | 178 | 0.57 | COMPARATIVE EXAMPLE |
| 204 | BB | 435 | −0.40 | 261 | 0.60 | EXAMPLE |
| 205 | BB | 411 | −0.42 | 242 | 0.59 | EXAMPLE |
| 206 | BB | 347 | −0.38 | 317 | <u>0.91</u> | COMPARATIVE EXAMPLE |
| 207 | BC | 338 | −0.33 | 193 | 0.57 | EXAMPLE |
| 208 | BC | 358 | −0.42 | 215 | 0.60 | EXAMPLE |
| 209 | BC | 313 | −0.41 | 271 | <u>0.87</u> | COMPARATIVE EXAMPLE |
| 210 | BD | 238 | −0.36 | 138 | 0.58 | EXAMPLE |
| 211 | BD | 264 | −0.42 | 135 | 0.51 | EXAMPLE |
| 212 | BD | 257 | −0.34 | 243 | <u>0.95</u> | COMPARATIVE EXAMPLE |
| 213 | BE | 365 | −0.39 | 190 | 0.52 | EXAMPLE |
| 214 | BE | 295 | −0.42 | 180 | 0.61 | EXAMPLE |
| 215 | BE | 328 | −0.40 | 190 | 0.58 | COMPARATIVE EXAMPLE |
| 216 | BF | 352 | −0.32 | 204 | 0.58 | EXAMPLE |
| 217 | BF | 372 | −0.40 | 164 | 0.44 | EXAMPLE |
| 218 | BF | 359 | −0.45 | 285 | <u>0.79</u> | COMPARATIVE EXAMPLE |

Table 20 to Table 23 illustrate results of evaluating characteristics of the steel sheets of experimental examples 1 to 109 and 201 to 218 by a method described below.

Tensile test pieces according to JIS Z 2201 were sampled from the steel sheets of experimental examples 1 to 109 and 201 to 218, a tensile test was performed according to JIS Z 2241, and yield stress "YS", tensile strength "TS", and total elongation "EL" were measured.

Further, a hole expansion test (JFST1001) for evaluating flangeability was performed, and a hole expansion limit value "2" as an index of stretch flangeability was calculated.

Further, a 90-degree V bending test was performed. A test piece of 35 mm×100 mm was cut out from the steel sheets of experimental examples 1 to 109, a shear cut surface was mechanically polished, and a bend radius was set to double the sheet thickness, to thereby perform evaluation. Then, one that became a predetermined shape was evaluated as passed (O), and one that did not become the predetermined shape was evaluated as failed (X). Further, at the time of the bending test, presence of crack, necking, and plating peeling was evaluated separately by visual observation, and one having none of them was evaluated as passed (O), and one having any of them was evaluated as (X).

TABLE 20

STEEL SHEET CHARACTERISTIC EVALUATION RESULT

| EXPERIMENTAL EXAMPLE | CHEMICAL COMPONENT | TENSILE TEST YS MPa | TS MPa | EL % | λ % | BENDING TEST (MINIMUM BENDING RADIUS)/(SHEET THICKNESS) | PLATING PEELING | NECKING | |
|---|---|---|---|---|---|---|---|---|---|
| 1 | A | 373 | 938 | 19 | 45 | ○ | ○ | ○ | EXAMPLE |
| 2 | A | 450 | 958 | 19 | 42 | ○ | ○ | ○ | EXAMPLE |
| 3 | A | 444 | 985 | 18 | 50 | ○ | ○ | ○ | EXAMPLE |
| 4 | A | 474 | 965 | 19 | 50 | ○ | ○ | ○ | EXAMPLE |
| 5 | A | 337 | <u>880</u> | 16 | 14 | X | ○ | X | COMPARATIVE EXAMPLE |
| 6 | A | 367 | 960 | 19 | 17 | X | ○ | X | COMPARATIVE EXAMPLE |
| 7 | B | 425 | 907 | 18 | 52 | ○ | ○ | ○ | EXAMPLE |
| 8 | B | 460 | 917 | 22 | 43 | ○ | ○ | ○ | EXAMPLE |
| 9 | B | 518 | 942 | 18 | 41 | ○ | ○ | ○ | EXAMPLE |
| 10 | B | 490 | 933 | 18 | 47 | ○ | ○ | ○ | EXAMPLE |
| 11 | B | 458 | <u>738</u> | 5 | 15 | X | ○ | X | COMPARATIVE EXAMPLE |
| 12 | B | 464 | 927 | 24 | 5 | X | ○ | X | COMPARATIVE EXAMPLE |
| 13 | C | 733 | 1284 | 14 | 40 | ○ | ○ | ○ | EXAMPLE |
| 14 | C | 604 | 1111 | 15 | 41 | ○ | ○ | ○ | EXAMPLE |
| 15 | C | 681 | 1189 | 15 | 37 | ○ | ○ | ○ | EXAMPLE |
| 16 | C | 738 | 1161 | 14 | 51 | ○ | ○ | ○ | EXAMPLE |
| 17 | C | 644 | 1131 | 16 | 49 | ○ | ○ | X | COMPARATIVE EXAMPLE |
| 18 | C | 706 | 1122 | 15 | 19 | X | ○ | ○ | COMPARATIVE EXAMPLE |
| 19 | D | 493 | 1078 | 16 | 45 | ○ | ○ | ○ | EXAMPLE |
| 20 | D | 463 | 1077 | 16 | 46 | ○ | ○ | ○ | EXAMPLE |
| 21 | D | 504 | 996 | 17 | 39 | ○ | ○ | ○ | EXAMPLE |
| 22 | D | 449 | 1035 | 15 | 43 | ○ | ○ | ○ | EXAMPLE |
| 23 | D | 500 | 1008 | 19 | 11 | X | ○ | ○ | COMPARATIVE EXAMPLE |
| 24 | D | 441 | 1055 | 15 | 39 | ○ | ○ | X | COMPARATIVE EXAMPLE |
| 25 | E | 640 | 1343 | 13 | 38 | ○ | ○ | ○ | EXAMPLE |
| 26 | E | 673 | 1175 | 15 | 32 | ○ | ○ | ○ | EXAMPLE |
| 27 | E | 559 | 1324 | 13 | 37 | ○ | ○ | ○ | EXAMPLE |
| 28 | E | 534 | 1118 | 16 | 29 | X | ○ | X | COMPARATIVE EXAMPLE |
| 29 | E | 729 | 1435 | 12 | 31 | X | ○ | X | COMPARATIVE EXAMPLE |
| 30 | F | 475 | 1032 | 17 | 39 | ○ | ○ | ○ | EXAMPLE |
| 31 | F | 628 | 1100 | 16 | 49 | ○ | ○ | ○ | EXAMPLE |
| 32 | F | 571 | 1032 | 17 | 43 | ○ | ○ | ○ | EXAMPLE |
| 33 | F | 502 | 1189 | 12 | 1 | X | ○ | X | COMPARATIVE EXAMPLE |
| 34 | F | 786 | 1255 | 9 | 28 | X | ○ | X | COMPARATIVE EXAMPLE |
| 35 | G | 756 | 1335 | 14 | 31 | ○ | ○ | ○ | EXAMPLE |
| 36 | G | 549 | 1236 | 14 | 35 | ○ | ○ | ○ | EXAMPLE |
| 37 | G | 595 | 1240 | 14 | 42 | ○ | ○ | ○ | EXAMPLE |
| 38 | G | 503 | 902 | 9 | 17 | X | X | X | COMPARATIVE EXAMPLE |
| 39 | G | 665 | 1112 | 15 | 33 | ○ | X | ○ | COMPARATIVE EXAMPLE |

TABLE 21

STEEL SHEET CHARACTERISTIC EVALUATION RESULT

| EXPERIMENTAL EXAMPLE | CHEMICAL COMPONENT | TENSILE TEST | | | | BENDING TEST (MINIMUM BENDING RADIUS)/ (SHEET THICKNESS) | PLATING PEELING | NECKING | |
|---|---|---|---|---|---|---|---|---|---|
| | | YS MPa | TS MPa | EL % | λ % | | | | |
| 40 | H | 541 | 1376 | 12 | 32 | ○ | ○ | ○ | EXAMPLE |
| 41 | H | 753 | 1382 | 14 | 38 | ○ | ○ | ○ | EXAMPLE |
| 42 | H | 564 | 1280 | 15 | 36 | ○ | ○ | ○ | EXAMPLE |
| 43 | H | 786 | 1360 | 13 | 40 | ○ | X | ○ | COMPARATIVE EXAMPLE |
| 44 | H | 516 | 944 | 10 | 8 | X | X | X | COMPARATIVE EXAMPLE |
| 45 | I | 651 | 1017 | 19 | 54 | ○ | ○ | ○ | EXAMPLE |
| 46 | I | 648 | 977 | 18 | 45 | ○ | ○ | ○ | EXAMPLE |
| 47 | I | 524 | 1012 | 16 | 39 | ○ | ○ | ○ | EXAMPLE |
| 48 | I | 542 | 954 | 19 | 42 | ○ | ○ | ○ | EXAMPLE |
| 49 | I | 612 | 979 | 18 | 42 | ○ | ○ | ○ | EXAMPLE |
| 50 | J | 524 | 1249 | 13 | 34 | ○ | ○ | ○ | EXAMPLE |
| 51 | J | 613 | 1073 | 16 | 45 | ○ | ○ | ○ | EXAMPLE |
| 52 | J | 538 | 1122 | 15 | 48 | ○ | ○ | ○ | EXAMPLE |
| 53 | J | 756 | 1261 | 14 | 40 | ○ | ○ | ○ | EXAMPLE |
| 54 | J | 455 | 1042 | 16 | 42 | ○ | ○ | ○ | EXAMPLE |
| 55 | K | 455 | 972 | 19 | 51 | ○ | ○ | ○ | EXAMPLE |
| 56 | K | 523 | 959 | 20 | 39 | ○ | ○ | ○ | EXAMPLE |
| 57 | K | 588 | 1005 | 16 | 43 | ○ | ○ | ○ | EXAMPLE |
| 58 | L | 559 | 1014 | 18 | 37 | ○ | ○ | ○ | EXAMPLE |
| 59 | L | 532 | 1075 | 15 | 43 | ○ | ○ | ○ | EXAMPLE |
| 60 | L | 582 | 1021 | 15 | 35 | ○ | ○ | ○ | EXAMPLE |
| 61 | M | 774 | 1286 | 13 | 44 | ○ | ○ | ○ | EXAMPLE |
| 62 | M | 607 | 1063 | 17 | 44 | ○ | ○ | ○ | EXAMPLE |
| 63 | M | 575 | 1100 | 17 | 40 | ○ | ○ | ○ | EXAMPLE |
| 64 | N | 627 | 1073 | 16 | 34 | ○ | ○ | ○ | EXAMPLE |
| 65 | N | 520 | 1244 | 15 | 37 | ○ | ○ | ○ | EXAMPLE |
| 66 | N | 572 | 1071 | 16 | 50 | ○ | ○ | ○ | EXAMPLE |
| 67 | O | 687 | 1329 | 13 | 32 | ○ | ○ | ○ | EXAMPLE |
| 68 | O | 798 | 1316 | 14 | 35 | ○ | ○ | ○ | EXAMPLE |
| 69 | O | 530 | 1274 | 14 | 36 | ○ | ○ | ○ | EXAMPLE |
| 70 | P | 647 | 1028 | 17 | 42 | ○ | ○ | ○ | EXAMPLE |
| 71 | P | 606 | 982 | 18 | 46 | ○ | ○ | ○ | EXAMPLE |
| 72 | P | 620 | 994 | 18 | 43 | ○ | ○ | ○ | EXAMPLE |
| 73 | Q | 548 | 1038 | 15 | 52 | ○ | ○ | ○ | EXAMPLE |
| 74 | Q | 478 | 936 | 18 | 60 | ○ | ○ | ○ | EXAMPLE |
| 75 | Q | 554 | 1067 | 17 | 42 | ○ | ○ | ○ | EXAMPLE |
| 76 | R | 465 | 1095 | 15 | 46 | ○ | ○ | ○ | EXAMPLE |
| 77 | R | 733 | 1314 | 13 | 39 | ○ | ○ | ○ | EXAMPLE |
| 78 | R | 737 | 1210 | 13 | 35 | ○ | ○ | ○ | EXAMPLE |
| 79 | S | 576 | 1116 | 15 | 45 | ○ | ○ | ○ | EXAMPLE |

TABLE 22

STEEL SHEET CHARACTERISTIC EVALUATION RESULT

| EXPERIMENTAL EXAMPLE | CHEMICAL COMPONENT | TENSILE TEST | | | | BENDING TEST (MINIMUM BENDING RADIUS)/ (SHEET THICKNESS) | PLATING PEELING | NECKING | |
|---|---|---|---|---|---|---|---|---|---|
| | | YS MPa | TS MPa | EL % | λ % | | | | |
| 80 | S | 641 | 1072 | 16 | 48 | ○ | ○ | ○ | EXAMPLE |
| 81 | S | 679 | 1046 | 17 | 50 | ○ | ○ | ○ | EXAMPLE |
| 82 | T | 515 | 1079 | 18 | 43 | ○ | ○ | ○ | EXAMPLE |
| 83 | T | 563 | 1155 | 16 | 51 | ○ | ○ | ○ | EXAMPLE |
| 84 | T | 530 | 1173 | 15 | 47 | ○ | ○ | ○ | EXAMPLE |
| 85 | U | 545 | 1155 | 14 | 40 | ○ | ○ | ○ | EXAMPLE |
| 86 | U | 464 | 1042 | 15 | 44 | ○ | ○ | ○ | EXAMPLE |
| 87 | U | 624 | 1082 | 17 | 57 | ○ | ○ | ○ | EXAMPLE |
| 88 | V | 825 | 1471 | 11 | 28 | ○ | ○ | ○ | EXAMPLE |

TABLE 22-continued

STEEL SHEET CHARACTERISTIC EVALUATION RESULT

| EXPERIMENTAL EXAMPLE | CHEMICAL COMPONENT | TENSILE TEST | | | | BENDING TEST (MINIMUM BENDING RADIUS)/ (SHEET THICKNESS) | PLATING PEELING | NECKING | |
|---|---|---|---|---|---|---|---|---|---|
| | | YS MPa | TS MPa | EL % | λ % | | | | |
| 89 | V | 583 | 1345 | 14 | 27 | ○ | ○ | ○ | EXAMPLE |
| 90 | V | 875 | 1462 | 11 | 25 | ○ | ○ | ○ | EXAMPLE |
| 91 | W | 676 | 1073 | 17 | 35 | ○ | ○ | ○ | EXAMPLE |
| 92 | W | 673 | 1114 | 15 | 38 | ○ | ○ | ○ | EXAMPLE |
| 93 | W | 579 | 993 | 17 | 57 | ○ | ○ | ○ | EXAMPLE |
| 94 | W | 707 | 934 | 2 | 13 | X | ○ | X | COMPARATIVE EXAMPLE |
| 95 | X | 552 | 977 | 18 | 44 | ○ | ○ | ○ | EXAMPLE |
| 96 | X | 524 | 906 | 18 | 57 | ○ | ○ | ○ | EXAMPLE |
| 97 | X | 469 | 903 | 19 | 49 | ○ | ○ | ○ | EXAMPLE |
| 98 | X | 546 | 953 | 7 | 10 | X | ○ | X | COMPARATIVE EXAMPLE |
| 99 | Y | 645 | 1136 | 15 | 32 | ○ | ○ | ○ | EXAMPLE |
| 100 | Y | 580 | 1169 | 16 | 45 | ○ | ○ | ○ | EXAMPLE |
| 101 | Y | 541 | 1283 | 13 | 39 | ○ | ○ | ○ | EXAMPLE |
| 102 | Y | 519 | 1085 | 15 | 43 | ○ | ○ | ○ | EXAMPLE |
| 103 | Z | 723 | 1320 | 13 | 36 | ○ | ○ | ○ | EXAMPLE |
| 104 | Z | 583 | 1218 | 13 | 39 | ○ | ○ | ○ | EXAMPLE |
| 105 | Z | 638 | 1145 | 16 | 31 | ○ | ○ | ○ | EXAMPLE |
| 106 | Z | 819 | 1363 | 14 | 28 | ○ | ○ | ○ | EXAMPLE |
| 107 | AA | 219 | <u>391</u> | 42 | 110 | ○ | ○ | ○ | COMPARATIVE EXAMPLE |
| 108 | AB | 532 | <u>864</u> | 20 | 20 | ○ | ○ | ○ | COMPARATIVE EXAMPLE |
| 109 | AC | 544 | 852 | 24 | 14 | X | ○ | X | COMPARATIVE EXAMPLE |

TABLE 23

MATERIAL MEASUREMENT RESULT

| EXPERIMENTAL EXAMPLE | CHEMICAL COMPONENT | TENSILE TEST | | | | BENDING TEST (MINIMUM BENDING RADIUS)/ (SHEET THICKNESS) | PLATING PEELING | NECKING | |
|---|---|---|---|---|---|---|---|---|---|
| | | YS MPa | TS MPa | EL % | λ % | | | | |
| 201 | BA | 708 | 989 | 17 | 50 | ○ | ○ | ○ | EXAMPLE |
| 202 | BA | 672 | 1016 | 18 | 37 | ○ | ○ | ○ | EXAMPLE |
| 203 | BA | IMPOSSIBLE TO PERFORM MATERIAL MEASUREMENT TEST DUE TO DEFECTIVE SHAPE OF STEEL SHEET | | | | | | | COMPARATIVE EXAMPLE |
| 204 | BB | 976 | 1331 | 13 | 32 | ○ | ○ | ○ | EXAMPLE |
| 205 | BB | 1048 | 1355 | 13 | 43 | ○ | ○ | ○ | EXAMPLE |
| 206 | BB | 834 | 1174 | 16 | 37 | X | ○ | X | COMPARATIVE EXAMPLE |
| 207 | BC | 838 | 1225 | 14 | 42 | ○ | ○ | ○ | EXAMPLE |
| 208 | BC | 893 | 1246 | 16 | 44 | ○ | ○ | ○ | EXAMPLE |
| 209 | BC | 825 | 1191 | 16 | 45 | X | ○ | X | COMPARATIVE EXAMPLE |
| 210 | BD | 547 | 936 | 23 | 44 | ○ | ○ | ○ | EXAMPLE |
| 211 | BD | 594 | 952 | 19 | 43 | ○ | ○ | ○ | EXAMPLE |
| 212 | BD | IMPOSSIBLE TO PERFORM MATERIAL MEASUREMENT TEST DUE TO DEFECTIVE SHAPE OF STEEL SHEET | | | | | | | COMPARATIVE EXAMPLE |
| 213 | BE | 855 | 1171 | 14 | 46 | ○ | ○ | ○ | EXAMPLE |
| 214 | BE | 716 | 1071 | 18 | 36 | ○ | ○ | ○ | EXAMPLE |
| 215 | BE | IMPOSSIBLE TO PERFORM MATERIAL MEASUREMENT TEST DUE TO DEFECTIVE SHAPE OF STEEL SHEET | | | | | | | COMPARATIVE EXAMPLE |
| 216 | BF | 939 | 1227 | 14 | 48 | ○ | ○ | ○ | EXAMPLE |
| 217 | BF | 961 | 1295 | 14 | 38 | ○ | ○ | ○ | EXAMPLE |
| 218 | BF | 991 | 1363 | 13 | 38 | X | ○ | X | COMPARATIVE EXAMPLE |

As illustrated in Table 20 to Table 23, the tensile strength was 900 MPa or more and the result of bending test was 0 in all the experimental examples which are examples of the present invention among experimental examples 1 to 109 and 201 to 218.

On the other hand, in the experimental examples which are comparative examples among experimental examples 1 to 109 and 201 to 218, the tensile strength was less than 900 MPa or X was included in results of bending test, and they did not satisfy the excellence in both high strength and bendability.

In experimental example 107, the added amount of C is small and a hard structure cannot be obtained, and thus strength is inferior.

In experimental example 108, the added amount of Si is small, solid-solution strengthening of soft structure is insufficient, surface hardness of the steel sheet softens largely compared to its inside, and thus stretch flangeability and strength are inferior.

In experimental example 109, the added amount of Mn is small, the volume fraction of retained austenite which becomes a starting point of destruction is large, and thus stretch flangeability and bendability are inferior.

Experimental example 94 is an example in which completion temperature of hot rolling is low, the microstructure extends in one direction and is heterogeneous, and thus ductility, stretch flangeability, and bendability are inferior.

Experimental example 98 is an example in which temperature for coiling on a coil is high after hot rolling, the microstructure becomes quite coarse, and thus ductility, stretch flangeability, and bendability are inferior.

Experimental example 6 is an example in which the heating rate in the annealing step is slow, decarburization in the steel sheet proceeds, hardness of the surface layer decreases largely, and thus stretch flangeability and bendability are inferior.

Experimental example 11 is an example in which the maximum heating temperature in the annealing step is low, many coarse iron-based carbides which become a starting point of destruction are contained, and thus ductility, stretch flangeability, and bendability are inferior.

On the other hand, experimental example 12 is an example in which the maximum heating temperature in the annealing step is high, the volume fraction of retained austenite which becomes a starting point of destruction is large, and thus stretch flangeability and bendability are inferior.

Experimental example 17 is an example in which retention time in the decarburization treatment temperature region is short, hardness of the surface layer is excessively high, and thus bendability is inferior.

On the other hand, experimental example 18 is an example in which retention time in the decarburization treatment temperature region is long, hardness of the surface layer decreased excessively, and thus stretch flangeability and bendability are inferior.

Experimental example 23 is an example in which water vapor partial pressure in the atmosphere in the decarburization treatment temperature region is high, hardness of the surface layer decreases excessively, and thus bendability is inferior.

On the other hand, experimental example 24 is an example in which water vapor partial pressure in the atmosphere in the decarburization treatment temperature region is low, hardness of the surface layer is excessively high, and thus bendability is inferior.

Experimental examples 28, 29 are examples in which there is a large difference $\Delta\epsilon$ in total strain amounts which are introduced respectively into the front surface and the rear surface in the decarburization treatment temperature region, and bendability is inferior.

Experimental example 33 is an example in which the average cooling rate of 740° C. to 650° C. is low, the kurtosis in hardness distribution inside the steel sheet is large, and thus stretch flangeability and bendability are inferior.

On the other hand, experimental example 34 is an example in which the average cooling rate of 740° C. to 650° C. is high, the kurtosis in hardness distribution inside the steel sheet is large, and thus ductility and bendability are inferior.

Experimental example 5 is an example in which the average cooling rate of 650° C. to 500° C. is low, a hardness difference between the steel sheet surface layer and the inside is small, many iron-based carbides are also generated, and bendability is inferior.

Experimental example 38 is an example in which alloying treatment temperature of the plating layer is high, Fe % in the plating layer is excessive, coarse iron-based carbides which become a starting point of destruction are also generated inside the steel sheet, and thus ductility, stretch flangeability, and bendability are inferior.

On the other hand, experimental example 39 is an example in which alloying treatment temperature of the plating layer is low, Fe % in the plating layer is insufficient, and thus bendability is inferior.

Experimental example 43 is an example in which alloying treatment time of the plating layer is short, Fe % in the plating layer is insufficient, and bendability is inferior.

On the other hand, experimental example 44 is an example in which alloying treatment time of the plating layer is long, coarse iron-based carbides which become a starting point of destruction are generated inside the steel sheet, and thus ductility, stretch flangeability, and bendability are inferior.

Experimental example 203 is an example in which the sheet thickness of the steel sheet is significantly thin, flatness of the steel sheet cannot be maintained, and it was not possible to perform the predetermined characteristic evaluation test.

Experimental example 206 is an example in which there is a large difference $\Delta\epsilon$ in total strain amounts which are introduced respectively into the front surface and the rear surface, and bendability is inferior.

In experimental examples 209 and 218, the amount of strain introduced in one bending is small, hardness of the surface layer is excessively hard, and hence bendability is inferior.

In experimental examples 212 and 215, the amount of strain introduced in one bending is large, the shape of the steel sheet is impaired, sufficient flatness is not obtained, and it was not possible to perform the predetermined characteristic evaluation test.

What is claimed is:

1. A high-strength galvanized steel sheet excellent in bendability with maximum tensile strength of 900 MPa or more, comprising an alloyed galvanized layer formed on a surface of a base steel sheet containing, in mass %, C: 0.075 to 0.300%,
Si: 0.30 to 2.50%,
Mn: 1.30 to 3.50%,
P: 0.001 to 0.050%,
S: 0.0001 to 0.0100%,
Al: 0.005 to 1.500%,
N: 0.0001 to 0.0100%, and
O: 0.0001 to 0.0100% with a balance being constituted of iron and inevitable impurities, wherein:

retained austenite is limited to 8% or less in volume fraction in a range of ⅛ thickness to ⅜ thickness of the base steel sheet;

when plural measurement regions with a diameter of 1 μm or less are set in the range of ⅛ thickness to ⅜ thickness of the base steel sheet, measurement values of hardness in the plural measurement regions are arranged in an ascending order to obtain a hardness distribution, an integer N0.02 is obtained, which is a number obtained by multiplying a total number of measurement values of hardness by 0.02 and rounding up this number when this number includes a fraction, hardness of a measurement value which is N0.02-th largest from a measurement value of minimum hardness is taken as 2% hardness, an integer N0.98 is obtained, which is a number obtained by multiplying a total number of measurement values of hardness by 0.98 and rounding down this number when this number includes a fraction, and hardness of a measurement value which is N0.98-th largest from a measurement value of minimum hardness is taken as 98% hardness, kurtosis $K^*$ of the hardness distribution between the 2% hardness and the 98% hardness is −0.30 or less;

a ratio between Vickers hardness of surface layer of the base steel sheet and Vickers hardness of ¼ thickness of the base steel sheet is 0.35 to 0.70; and a content of iron in the alloyed galvanized layer is 8 to 12% in mass %.

2. The high-strength galvanized steel sheet excellent in bendability according to claim 1, wherein the structure of the base steel sheet contains, in volume fraction, 10 to 75% ferrite, 10 to 50% in total of either or both of bainitic ferrite and bainite, 10 to 50% tempered martensite in the range of ⅛ thickness to ⅜ thickness of the base steel sheet, the fresh martensite is limited to 15% or less in volume fraction, and perlite is limited to 5% or less in volume fraction.

3. The high-strength galvanized steel sheet excellent in bendability according to claim 1, wherein the base steel sheet further contains, in mass %, one or more of Ti: 0.005 to 0.150%,
Nb: 0.005 to 0.150%,
B: 0.0001 to 0.0100%,
Cr: 0.01 to 2.00%,
Ni: 0.01 to 2.00%,
Cu: 0.01 to 2.00%,
Mo: 0.01 to 1.00%,
W: 0.01 to 1.00%, and
V: 0.005 to 0.150%, and/or
0.0001 to 0.5000 mass % in total of one or more selected from the group consisting of Ca, Ce, Mg, Zr, Hf, and an element other than Ce belonging to the lanthanoid series.

4. The high-strength galvanized steel sheet excellent in bendability according to claim 1, wherein either or both of a coating film constituted of a phosphorus oxide and a coating film constituted of a composite oxide containing phosphorus is or are formed on a surface of the alloyed galvanized layer.

* * * * *